United States Patent [19]

Smith

[11] Patent Number: 4,699,532

[45] Date of Patent: Oct. 13, 1987

[54] METHOD AND APPARATUS FOR DISPENSING MONEY ORDERS

[75] Inventor: Lawrence G. Smith, Orlando, Fla.

[73] Assignee: Republic Money Orders, Dallas, Tex.

[21] Appl. No.: 877,539

[22] Filed: Oct. 31, 1986

Related U.S. Application Data

[62] Division of Ser. No. 596,291, Apr. 3, 1984, Pat. No. 4,625,275.

[51] Int. Cl.$^4$ ............................................. B41J 5/00
[52] U.S. Cl. .................................... 400/104; 364/406; 364/479; 235/379; 235/432; 382/1; 382/7
[58] Field of Search .................... 400/50, 104–106; 364/401, 405, 406, 479; 235/379, 432, 431; 382/1, 7

[56] References Cited

U.S. PATENT DOCUMENTS

| | | | |
|---|---|---|---|
| 3,814,227 | 6/1974 | Hurd, III et al. | 400/121 |
| 3,848,798 | 11/1974 | Riley | 235/101 |
| 3,970,992 | 7/1976 | Boothroyd | 364/906 |
| 3,984,660 | 10/1976 | Oka et al. | 235/379 |
| 3,997,763 | 12/1976 | Schasser | 235/432 |
| 4,025,905 | 5/1977 | Gorgens | 364/906 |
| 4,035,792 | 7/1977 | Price et al. | 340/570 |
| 4,053,735 | 10/1977 | Foudos | 364/401 |
| 4,082,945 | 4/1978 | van De Goor et al. | 235/379 |
| 4,175,694 | 11/1979 | Donabin | 235/431 |
| 4,225,779 | 9/1980 | Sano et al. | 364/900 |
| 4,266,121 | 5/1981 | Hirose | 235/381 |
| 4,270,042 | 5/1981 | Case | 235/379 |
| 4,317,028 | 2/1982 | Simjian | 235/379 |
| 4,341,951 | 7/1982 | Benton | 364/406 |
| 4,355,369 | 10/1982 | Garvin | 364/900 |
| 4,385,285 | 5/1983 | Horst et al. | 235/379 |
| 4,417,137 | 11/1983 | Lundblad | 235/379 |
| 4,494,127 | 1/1985 | King | 400/105 |
| 4,523,330 | 6/1985 | Cain | 235/379 |
| 4,572,946 | 2/1986 | Schrenk | 235/379 |
| 4,624,588 | 11/1986 | Bivin | 400/105 |
| 4,625,275 | 11/1986 | Smith | 364/401 |
| 4,630,201 | 12/1986 | White | 235/379 |
| 4,637,051 | 1/1987 | Clark | 400/104 |
| 4,641,346 | 2/1987 | Clark et al. | 400/104 |
| 4,641,347 | 2/1987 | Clark et al. | 400/104 |

Primary Examiner—E. H. Eickholt
Attorney, Agent, or Firm—Michael A. O'Neil

[57] ABSTRACT

A method and apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory (E$^2$PROM) for storing a security inhibit printing code, this code being automatically changed to prevent actuation of the printer when the security of the dispenser is comprised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

5 Claims, 5 Drawing Figures

| 40a | | | 40 | | 40b |
|---|---|---|---|---|---|
| 7 | 8 | 9 | START | TRANSMIT | LOAD |
| 4 | 5 | 6 | NO FEE | DEFINE | DAY/SHIFT |
| 1 | 2 | 3 | ID | VENDOR PAYMENT | DISPLAY |
| VOID | 0 | ENTER | MONEY ORDER | TOTAL | PRINT |

METHOD AND APPARATUS FOR DISPENSING MONEY ORDERS

This application is a division of Ser. No. 596,291 filed Apr. 3, 1984 now U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser cumbersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programamble read only memory ($E^2PROM$). This $E^2PROM$ stores a security inhibit printing code which must be "recognized" by a printer software routine to enable the dot matrix printer. Each dispenser further stores a control software routine which operates to change or erase the security inhibit printing code stored in the $E^2PROM$ when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order to a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2PROM$ associated with each processor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
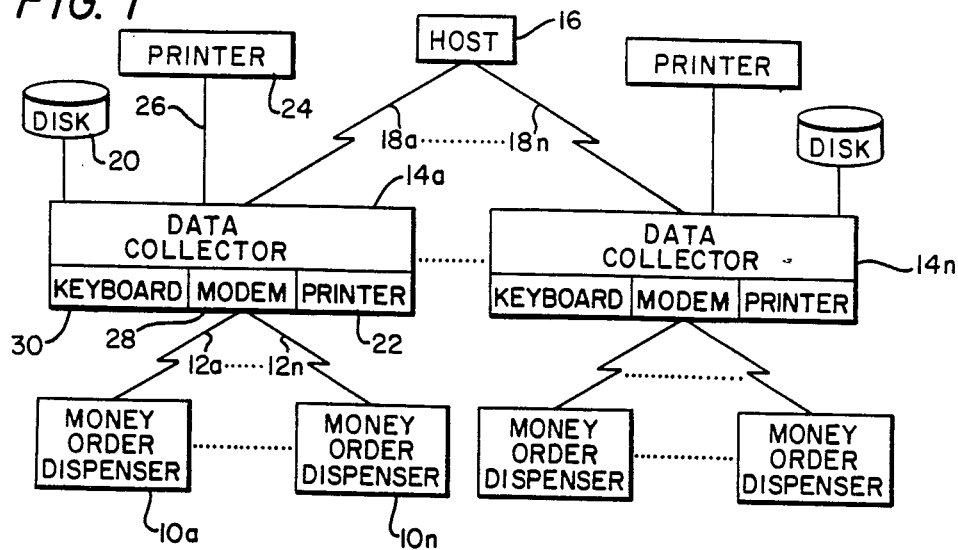
FIG. 1 is a block diagram of a desired system configuration incorporating a plurality of money order dispensers connected to one or more data collector devices, which are in turn connected to a host device.

With reference now to the FIGURES wherein like reference charactes designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a-10n on a time-shared basis. In the preferred embodiment, a plurality of data collectors 14a-n are connected to a host device 16 through communications links 18a-18n. Each communications link 18 is either a modem link or an RS232 serial full-duplex interface for direct connection to the host device 16. Alternately the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a-10n. Data collector 14a also includes an internal printer 22 for printing this transaction information, although alternately, an external printer 24 is used for this purpose through an RS232 serial link 26. An internal modem 28 is also provided for direct communications to the money order dispensers 10a-10n over the communications links 12a-12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
| --- | --- |
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MO$ XXXXX.XX-] | Maximum dollar value per money order per customer |
| [-MCH CK# XXXXX-] | Maximum number of vendor payments which may be printed before dispenser must be reauthorized |
| [-MCH CK# XXXXX.XX-] | Maximum vendor payment dollar amount which can be issued before dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN-#BLANKS XX-] | Number of blank money orders left in dispenser when warning issued |
| [-WARN-#TRANS XX-] | Amount of transaction storage left in dispenser memory when warning is issued |
| [-LOCK # ERRORS XX-] | Number of errors allowed before dispenser locks. |

As used throughout the remainder of the specification, the above limits and codes are referred to as "control" data. This control data is transmitted to the various money order devices 10a-10n located at the plurality of retail establishments.

Preferably, each of the other data collectors 14 shown in FIG. 1 include the same type of peripheral devices associated with the data collector 14a. The data collectors 14a-n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
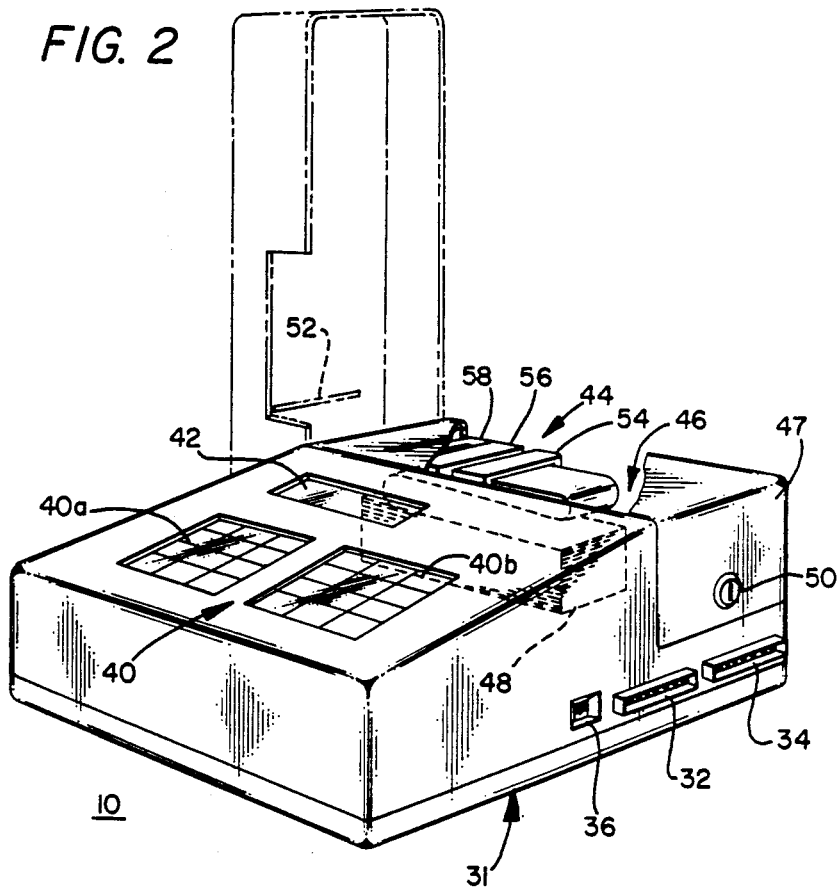
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means in required since normal printing of the indicia would render the money order unreadable due to the transverse feed. Accordingly, a printer software routine to be described is provided for controlling the printer to produce readable alphanumeric indicia on the printed money orders.

Figures 3, 4:
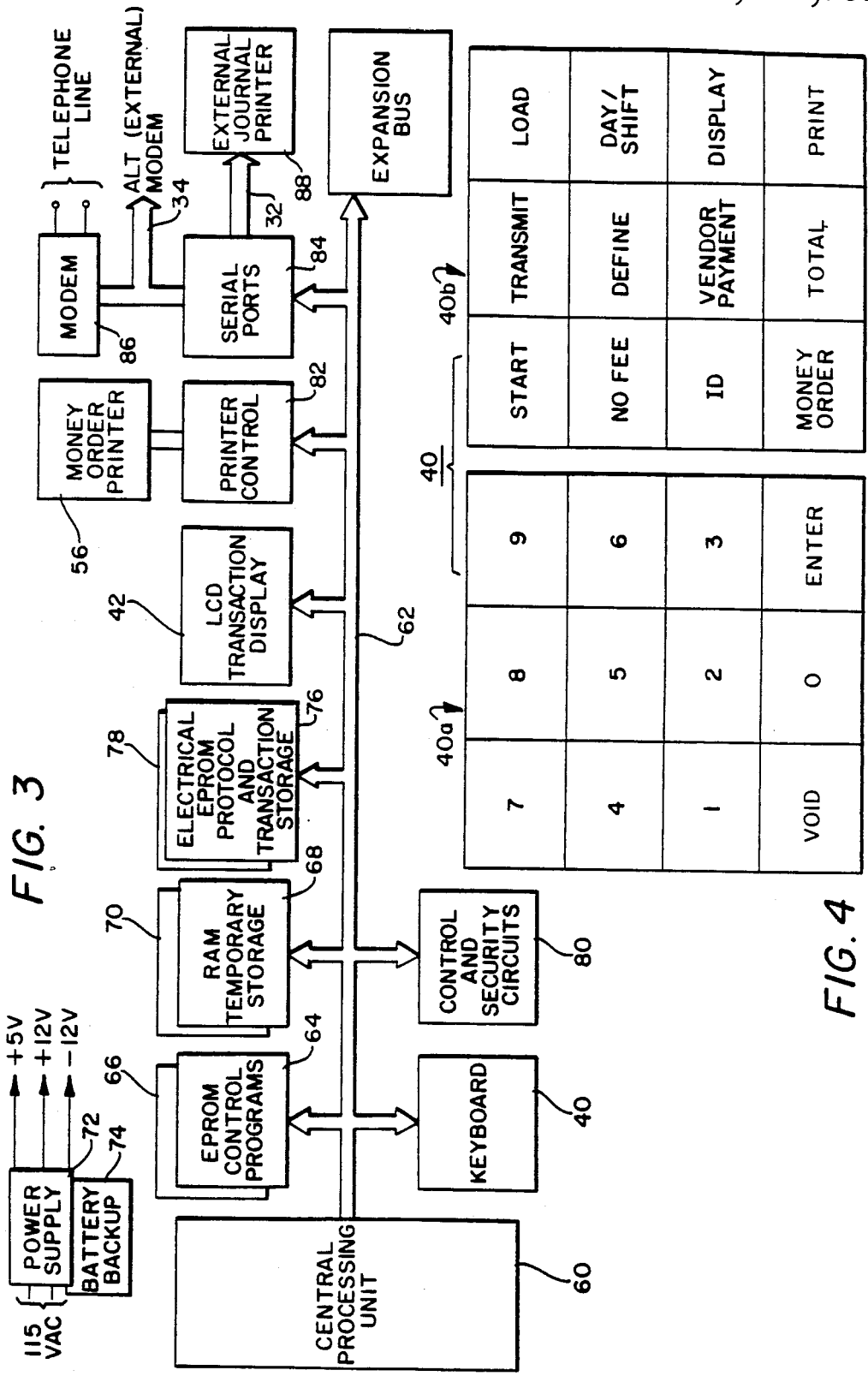
FIG. 3 is a block diagram of the electronic hardware incorporated in the money order dispenser of FIG. 2.
FIG. 4 is a representation of the preferred embodiment of the keyboard used in the money order dispenser of FIG. 2.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM'S 64 and 66 are connected to the CPU 60 by the bus 62. As also seen in FIG. 3, the money order dispenser 10 incldues random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power by suddenly interrupted to the dispenser 10.

The money order dispenser 10 further includes a pair of electrically-eraseable programmable read only memories (E$^2$PROM's), or equivalent semi-permanent memory devices such as a battery supported RAM, 76 and 78 connected to the CPU 60 by the bus 62. The E$^2$PROM 76 is provided for storing various communication protocols utilized by the money order dispenser. In particular, the E$^2$PROM 76 supports the NRC foreign attachment protocol, MSI special protocol, SDLC protocol and IBM 3680 store system interface. Additional protocols may be down-loaded into the E$^2$PROM 76 by the data collector as required. Data and control codes for the above protocols are well known in the prior art and a description thereof is unnecessary for a complete understanding of the present invention.

According to a feature of the present invention, the E$^2$PROM 78 is provided to store the transaction data for between 500-2000 vendor/customer transactions. Moreover, the E$^2$PROM 78 also stores a security inhibit printing code for the money order dispenser 10 for security purposes. The printer software routine for controlling the dot matrix printer 56 must "recognize" the security inhibit printing code resident in E$^2$PROM 78 in order to operate the dot matrix printer 56. If the security of the money order dispenser is compromised in any way, a control software routine stored in EPROM 64 operates to change or erase the security inhibit printing code stored in the E$^2$PROM 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the E$^2$PROM 78 is approximately filled with transaction data. The money order dispenser 10 will discontinue further issuance of money orders and notify the operator if the E$^2$PROM 46 is full. According to the present invention, the transaction data is then transmitted to the respective data collector device of FIG. 1 before the money order dispenser 10 may again issue money orders. The use of the non-volatile reusable E$^2$PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software rountine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a " VOID" and " ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY #___-]

The security number is a five digit number and is not displayed. This number must be correctly entered by the vendor in order for the sequence ot continue. After the security number has been entered and verified, a manual entry of a store identification number is required. Accordingly, the followed store number message is displayed on the LCD display 42:

[-STXXXXXXXXXXXXXX-]

The store number may be 1-14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:
[-DATE XX/XX/XX-]

[-TIME XX:XX:XX:-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

[-ID USE X-]

Specifically, the system includes twenty money order fees where XXX.XX is the dollar breakpoint, and YY.YY is the fee charged for any money order greater than the previous money order and less than or equal to the present XXX.XX breakpoint The "ID USE" code takes on the following possible values:
0—No ID Number needs to be entered;
1—All ID Numbers are entered at the start of the day only;
2—A valid ID Number must be entered for each transaction.

Entering of the above code information at the money order dispenser, as well as the information in TABLE I at the data collector, constitutes the Definition Mode. Once the last enter key has been pressed at the dispenser, the display screen 24 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 92 is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed. The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40b. Depression of these keys will produce the following sequential display messages:

[-SECURITY #-]

[-BEG #XXXXXXXX-]

[-END #XXXXXXXX-]

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

[-SECURITY #-]

[-DIAL TELEPHONE #-]

After entering of the security number and dialing the telephone number for connection to the appropriate data collector, the operator places the phone receiver in the modem. The "START" key is then depressed to cause the dispenser to transmit the stored transaction data in E$^2$PROM 78 to the data collector. After transmission the following message is displayed to prompt the operator to disconnect the dispenser from the modem:

[-DISCONNECT RMOD-]

This constitutes the Transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of dot matrix printer 56 which is designed to receive a money order is a tranverse direction with respect to the printing of normal indicia thereon. The movement of money orders through the dot matrix printer in a transverse fashion facilities the use of a small dot matrix pritner, thereby reducing the overall dimensions of the money order dispenser of the present invention. However, since the money order is passed through the dot matrix printer in a transverse fashion, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Figure 5:
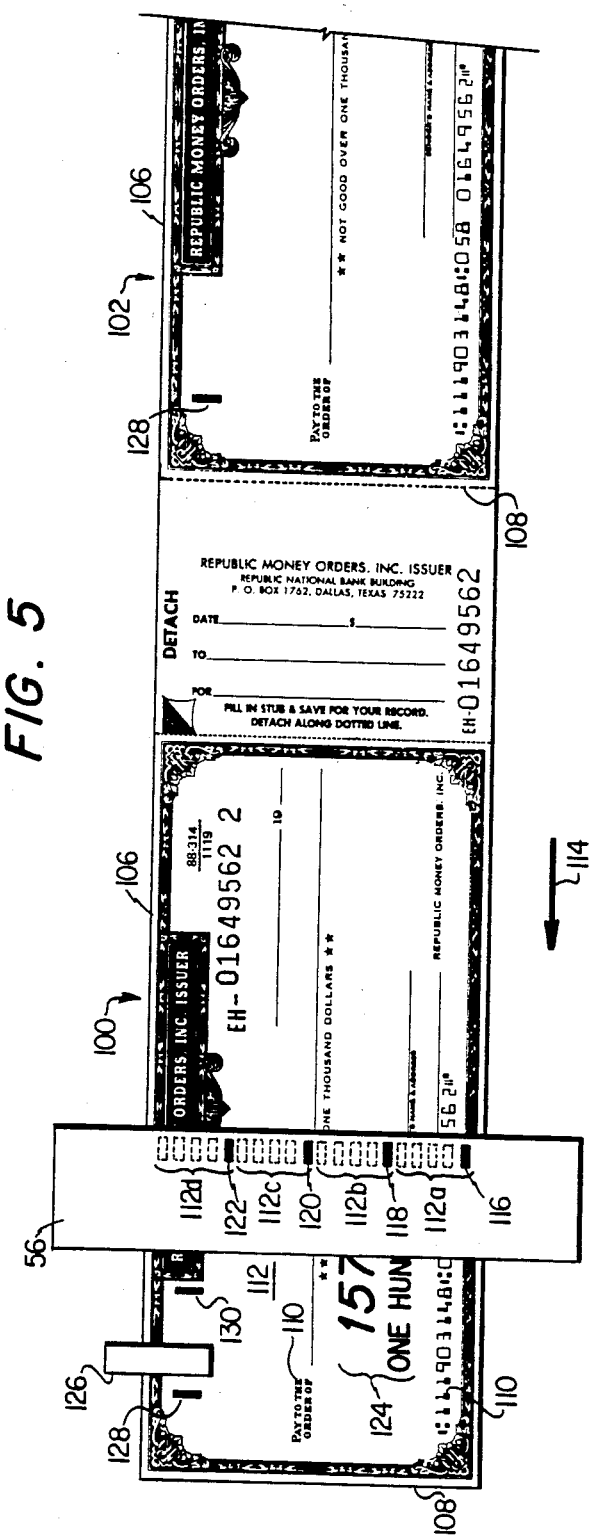
FIG. 5 is a top view of the dot matrix printer incorporated in the dispenser of FIG. 2 detailing the movement of a money order therethrough.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example elements 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, etc. The dot matrix printer 56 is preferably of the type manufactured by Epson Corporation.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

```
EEPROM DATA AREA

PAGE
;EEPROM DATA LOCATED AT E0000H-E3FFFH
EPRM    SEGMENT AT 0E000H
;DOWN LOADED STORE INFORMATION
SCRTY   DW      ?               ;SECURITY NUMBER
STACC   DW      ?               ;STORE # - MAJOR ACCOUNT
STSTE   DB      ?               ;STORE # - STATE
STSUB   DB      ?               ;STORE # - SUB ACCOUNT
STDIV   DW      ?               ;STORE # - DIVISION
STSTR   DW      ?               ;STORE # - STORE
MONTH   DB      ?               ;DATE - MONTH
DAY     DB      ?               ;DATE - DAY
YEAR    DB      ?               ;DATE - YEAR
PHONE   DB      11 DUP(?)       ;TELEPHONE NUMBER
USE     DB      ?               ;ID USE CODE-0=NO ID NEEDS TO BE ENTERED
                                ;           1=ONE ID PER SHIFT/DAY
                                ;           2=ID FOR EVERY TRANSACTION
ID      DB      NID DUP(?)      ;IDENTIFICATION NUMBERS

;A

;PROD STATUS INDICATORS - 0/1
PMOS    DB      ?               ;PROD STATUS    - CLOSED/OPEN
MDMS    DB      ?               ;MODEM STATUS   - DISCNCT/CNCT
CPPS    DB      ?               ;MC PRINTER STATUS - OK/DISABLED
JPPS    DB      ?               ;JR PRINTER STATUS - OK/DISABLED

;0 Assembler 03-06-84 .  PAGE   1-2

EEPROM DATA AREA

KEYES   DB      ?               ;KEYBOARD STATUS    - OK/LOCKED

;DATA DETERMINED AT RUN TIME-STORED HERE TO PRESERVE WHEN POWER OFF
LOCKC   DB      ?               ;ERROR COUNT BEFORE LOCKUP
TRPTR   DB      ?               ;TRANSACTION POINTER
TXPTR   DB      ?               ;TRANSMISSION POINTER
FIDT    DB      NID DUP(?)      ;FEE TOTAL PER ID

MCNT    DW      ?               ;MO NUMBER TOTAL
MAMT    DD      ?               ;MO AMOUNT TOTAL
VCNT    DW      ?               ;VP NUMBER TOTAL
VAMT    DD      ?               ;VP AMOUNT TOTAL
FAMT    DD      ?               ;FE AMOUNT TOTAL
VOID    DW      ?               ;NUMBER OF VOIDS
TCNT    DW      ?               ;TOTAL TRANSACTIONS
TAMT    DD      ?               ;TOTAL AMOUNT

;TRANSACTION BUFFER-FILLS UP REST OF EEPROM-ROTATING BUFFER
TRBFRS  DB      ?               ;START OF TRANSACTION BUFFER
TRBFRE  DB      ?               ;END OF TRANSACTION BUFFER
EPRM    ENDS
```

```
;EEPROM DATA LOCATED E4000H-E5FFFH
;DOWN LOADED PROTOCOL INFORMATION
EPRM    SEGMENT AT 0E400H
;*** NO DATA DEFINED ***
EPRM    ENDS
SUBTTL  START OF PROGRAM - POWER UP SELF TEST AND INITIALIZATION AT FE000H
START:  CLI                     ;DISABLE INTERRUPTS
                                ;TEST FLAGS, REGISTERS, CONDITIONAL JUMPS
        MOV     AH,0D5H         ;SET FLAGS-SF,ZF,AF,PF,CF
        SAHF
        JNS     STERR
        JNZ     STERR
        JNP     STERR
        JNC     STERR
        LAHF
        MOV     CL,5            ;SET CARRY
        SHR     AH,CL
        JNC     STERR
        MOV     AL,40H          ;SET OVERFLOW
        SHL     AL,1
        JNO     STERR
        XOR     AX,AX           ;CLEAR FLAGS
        SAHF
        JS      STERR
        JZ      STERR
        JP      STERR
        JC      STERR
        LAHF
        MOV     CL,5            ;RESET CARRY
        SHR     AH,CL
        JC      STERR
        SHL     AH,1            ;RESET OVERFLOW
        JO      STERR
                                ;TEST REGISTERS WITH ALL ONE'S AND ZERO'S
        MOV     AX,0FFFFH
        STC                     ;SET CARRY - LOOP CONTROL
STRT1:  MOV     DS,AX           ;LOOP TO WRITE PATTERN TO ALL REGISTERS
        MOV     BX,DS
        MOV     ES,BX
        MOV     CX,ES
        MOV     SS,CX
        MOV     DX,SS
        MOV     SP,DX
        MOV     BP,SP
        MOV     SI,BP
        MOV     DI,SI
        JNC     STRT2
        XOR     AX,DI           ;END OF FIRST TIME THROUGH
        JNZ     STERR           ;PATTERN NOT ALL ONE'S
        CLC                     ;CLEAR CARRY
        JNC     STRT1           ;REPEAT WITH ALL ZERO'S
STERR:  HLT                     ;POWER ON SELF TEST ERROR
STRT2:  OR      AX,DI           ;END OF SECOND TIME THROUGH
        JNZ     STERR           ;PATTERN NOT ALL ZERO'S
                                ;TEST RAM WITH FF,AA,55,01,00 PATTERNS
        SUB     AX,AX           ;INITIALIZE ES & DS
        MOV     ES,AX
        MOV     DS,AX
        SUB     DI,DI
        MOV     BX,LMCSD        ;COMPUTE UPPER LIMIT OF RAM
        MOV     CL,4
        SHL     BX,CL           ;CANNOT BE > 0FFFFH
        OR      BX,007FH        ;RAM COUNT
        MOV     AX,0FFFFH
        MOV     DX,55AAH
```

```
        CLD                     ;INCREMENT FLAG
        MOV     CX,BX           ;COUNT
        REP     STOSB           ;FILL RAM WITH FIRST PATTERN
STRT3:  DEC     DI              ;POINT TO LAST BYTE
        STD                     ;DECREMENT FLAG
STRT4:  MOV     SI,DI
        MOV     CX,BX
STRT5:  LODSB                   ;READ PATTERN STORED
        XOR     AL,AH           ;TEST IF OK
        JNE     STERR           ;TEST NOT OK
        CMP     AH,0
        JE      STRT6           ;ZERO PATTERN
        MOV     AL,DL
        STOSB                   ;WRITE NEXT PATTERN
STRT6:  LOOP    STRT5           ;CONTINUE UNTIL ALL OF RAM TESTED
        CMP     AH,0
        JE      STRT7           ;RAM TEST COMPLETE
        MOV     AH,AL           ;ROTATE PATTERN
        XCHG    DH,DL
        CLD                     ;INCREMENT FLAG
        INC     DI              ;POINT TO START BYTE
        JZ      STRT4           ;READ/WRITE FORWARD
        DEC     DI              ;READ/WRITE BACKWARD
        MOV     DX,1            ;00 AND 01 PATTERN
        JMP     STRT3
                                ;INITIALIZE SEGMENT REGISTER & STACK
STRT7:  MOV     AX,DATA
        MOV     DS,AX
        MOV     AX,EPRM
        MOV     ES,AX
        MOV     AX,STACK
        MOV     SS,AX
        MOV     SP,OFFSET STACKT
                                ;INITIALIZE THE CHIP SELECT CONTROLLER
        MOV     DX,LMCSR        ;LOWER MEMORY CHIP SELECT
        MOV     AX,LMCSD        ;16K AT 0 - 3FFFH
        OUT     DX,AX
        MOV     DX,PACSR        ;PERIPHERAL CHIP SELECT
        MOV     AX,PACSD
        OUT     DX,AX
        MOV     DX,MMCSR        ;MID-RANGE MEMORY CHIP SELECT
        MOV     AX,MMCSD        ;16K AT E0000H
        OUT     DX,AX
        MOV     DX,MPCSR        ;MID-RANGE MEMORY SIZE
        MOV     AX,MPCSD
        OUT     DX,AX
                                ;INITIALIZE 8155 - A
        MOV     DX,A8155CS      ;CONTROLS CLOCK, KEYBOARD, DISPLAY
        MOV     AL,A8155CD      ;PORT A,B,C OUTPUTS, NO TIMER
        OUT     DX,AL
        INC     DX              ;PORT A ADDRESS
        MOV     AL,A8155DA      ;ALL OUTPUTS HIGH
        OUT     DX,AL
        INC     DX              ;PORT B ADDRESS
        OUT     DX,AL
        INC     DX              ;PORT C ADDRESS
        OUT     DX,AL
        INC     DX              ;TIMER LOW COUNT ADDRESS
        MOV     AL,A8155TD      ;NO TIME
        OUT     DX,AL
        INC     DX              ;TIMER HIGH COUNT ADDRESS
        OUT     DX,AL
                                ;INITIALIZE 8155 - B
```

```
            MOV     DI,88155CS       ;MONITORS DIP SWITCHES
            MOV     AL,88155CD       ;PORT A INPUTS,  B&C OUTPUTS, NO TIMER
            OUT     DI,AL
            INC     DI               ;PORT A ADDRESS
            MOV     AL,88155DA       ;ALL INPUTS HIGH
            OUT     DI,AL
            INC     DI               ;PORT B ADDRESS
            OUT     DI,AL            ;ALL OUTPUTS HIGH
            INC     DI               ;PORT C ADDRESS
            OUT     DI,AL
            INC     DI               ;TIMER LOW COUNT ADDRESS
            MOV     AL,88155TD       ;NO TIME
            OUT     DI,AL
            INC     DI               ;TIMER HIGH COUNT ADDRESS
            OUT     DI,AL
;*** NO PROGRAM YET ***               ;INITIALIZE THE DMA CONTROLLER
;*** NO PROGRAM YET ***               ;INITIALIZE THE TIME CONTROLLER
;*** NO PROGRAM YET ***               ;INITIALIZE THE INTERRUPT CONTROLLER
            CALL    CLKINT           ;INITIALIZE CLOCK
            CALL    DSPINT           ;INITIALIZE DISPLAY
            CALL    JPRTINT          ;INITIALIZE JOURNAL PRINTER
            CALL    CPRTINT          ;INITIALIZE CHECK PRINTER
                                     ;SETUP INTERRUPT VECTOR TABLE
            MOV     ES:NMIPTR,OFFSET NMI
            MOV     ES:NMIPTR+2,CODE
            MOV     ES:TMROPTR,OFFSET TMR0
            MOV     ES:TMROPTR+2,CODE
            MOV     ES:DMA0PTR,OFFSET DMA0
            MOV     ES:DMA0PTR+2,CODE
            MOV     ES:DMA1PTR,OFFSET DMA1
            MOV     ES:DMA1PTR+2,CODE
            MOV     ES:INT0PTR,OFFSET INT0
            MOV     ES:INT0PTR+2,CODE
            MOV     ES:CLCKPTR,OFFSET CLCK
            MOV     ES:CLCKPTR+2,CODE
            MOV     ES:INT2PTR,OFFSET INT2
            MOV     ES:INT2PTR+2,CODE
            MOV     ES:INT3PTR,OFFSET INT3
            MOV     ES:INT3PTR+2,CODE
            MOV     ES:TMR1PTR,OFFSET TMR1
            MOV     ES:TMR1PTR+2,CODE
            MOV     ES:TMR2PTR,OFFSET TMR2
            MOV     ES:TMR2PTR+2,CODE

CALL    DSPCLR           ;CLEAR DISPLAY
            CLD                      ;FILL KEYBOARD BUFFER WITH SPACES
            MOV     DI,OFFSET KBFR
            MOV     CX,SKBFR
            MOV     AL,20H
       REP  STOSB
            STI                      ;ENABLE INTERRUPTS
STRT9:      CALL    RMDCK            ;CHECK PMOD
            CALL    KEYB             ;SCAN KEYBOARD
            CALL    PWRCK            ;CHECK FOR POWER DOWN
            JMP     STRT8            ;LOOP FOREVER
CODE        ENDS

;POWER ON RESET VECTOR - LOCATED AT 0FFFF0H
RESET   SEGMENT AT 0FFFFH
            MOV     DI,UMCSR         ;UPPER MEMORY CHIP SELECT
            MOV     AX,UMCSD         ;8K AT FE000H
            OUT     DI,AX
            JMP     FAR PTR START
```

```
            DB      'RM00'
RESET   ENDS
        END
```

CRO Assembler 03-05-84    PAGE   1-3

; INT VECTOR 3 - NON MASKABLE INTERRUPT - RM00 INTERLOCK

```
        PAGE
;NMI    PROCEDURE - REENTRANT, NON MASKABLE INTERRUPT
;          ENTRY - INTERRUPT 2
;          EXIT - RMODS=1 - OPEN
        PUBLIC  NMI
NMI     PROC    NEAR
        PUSH    BP
        MOV     BP,SP           ;ESTABLISH BASE POINTER
        PUSH    BX
        PUSH    AX
        PUSHF
        MOV     BX,OFFSET RMODS ;WRITE RM00 OPEN INDICATOR
        MOV     AL,01H
        CALL    WEEPRM          ;WRITE TO EEPROM ONE BYTE
        POPF
        POP     AX
        POP     BX
        POP     BP
        IRET
NMI     ENDP
        SUBTTL          INT0 - INTERRUPT 0
        ASSUME  CS:CGROUP, DS:DGROUP, SS:DGROUP, ES:ESROUP

;KEYBOARD CONSTANTS
NID     EQU     20              ;NUMBER OF IDENTIFICATION CODES
NFEE    EQU     20              ;NUMBER OF FEES
NTR     EQU     16              ;NUMBER OF TRANSACTIONS PER CUSTOMER/VENDOR
SKBFR   EQU     16              ;SIZE OF KEYBOARD BUFFER
SDBFR   EQU     16              ;SIZE OF DISPLAY BUFFER
KBDCS   EQU     300H            ;KEYBOARD COMMAND/STATUS ADDRESS
KBDCD   EQU     0CDH            ;PORT A & C OUTPUT, B INPUT
KBDRS   EQU     0F8H            ;ROW 1 SELECT
KBDRM   EQU     00FH            ;READ MASK
KNKEY   EQU     24              ;NUMBER OF KEYS
KNROW   EQU     6               ;NUMBER OF ROWS
KNCOL   EQU     4               ;NUMBER OF COLUMNS
KDBNC   EQU     4               ;DEBOUNCE CONSTANT
KBYTE   EQU     1               ;BYTE ENTRY
KWORD   EQU     2               ;WORD ENTRY
KDWRD   EQU     3               ;DWORD ENTRY
KREAL   EQU     4               ;REAL ENTRY
KALPHA  EQU     5               ;ALPHA ENTRY
KEY0    EQU     00H             ;0
KEY1    EQU     01H             ;1
KEY2    EQU     02H             ;2
KEY3    EQU     03H             ;3
KEY4    EQU     04H             ;4
KEY5    EQU     05H             ;5
KEY6    EQU     06H             ;6
KEY7    EQU     07H             ;7
KEY8    EQU     08H             ;8
KEY9    EQU     09H             ;9
KEYEN   EQU     0AH             ;ENTER
KEYVD   EQU     0BH             ;VOID
KEYST   EQU     0CH             ;START
```

```
KEYNF   EQU     0DH             ;NO FEE
KEYID   EQU     0EH             ;ID
KEYMO   EQU     0FH             ;MONEY ORDER
KEYTI   EQU     10H             ;TRANSMIT
KEYDF   EQU     11H             ;DEFINE
KEYVP   EQU     12H             ;VENDOR PAYMENT
KEYTO   EQU     13H             ;TOTAL
KEYLD   EQU     14H             ;LOAD
KEYDY   EQU     15H             ;DAY/SHIFT
KEYDS   EQU     16H             ;DISPLAY
KEYPR   EQU     17H             ;PRINT
KEYDTA  DB      KEYLD           ;KEY CODE TABLE
        DB      KEYDY
        DB      KEYDS
        DB      KEYPR
        DB      KEYTI
        DB      KEYDF
        DB      KEYVP
        DB      KEYTO
        DB      KEYST
        DB      KEYNF
        DB      KEYID
        DB      KEYMO
TITLE           RMDCK - CHECK RMOD STATUS REGIS
TERS
        PAGE    66,132
CGROUP  GROUP   CODE, CONST, RESET
DGROUP  GROUP   INTV, STACK, DATA
EGROUP  GROUP   EPRM

EPRM    SEGMENT PUBLIC 'EPRM'
        EXTRN   RMODS:BYTE, MODMS:BYTE, CKPRS:BYTE
        EXTRN   JRPRS:BYTE, KEYBS:BYTE, LOCKC:BYTE
        EXTRN   LOCK:BYTE
EPRM    ENDS

CODE    SEGMENT PUBLIC 'CODE'
        ASSUME  CS:CGROUP, DS:DGROUP, SS:DGROUP, ES:EGROUP
        EXTRN   WEEPRM:NEAR

;RMDCK  PROCEDURE - CHECKS ALL VITAL RMOD STATUS REGISTERS
;       IF RMOD WAS OPENED                      - RMODS=1 OR
;       IF ERROR COUNT EQUALS MAXIMUM           - LOCKC=LOCK
;       THEN MONEY ORDER PRINTER IS DISABLED    - CKPRS=1 AND
;            JOURNAL PRINTER IS DISABLED        - JRPRS=1 AND
;            KEYBOARD IS LOCKED                 - KEYBS=1
        PUBLIC  RMDCK
RMDCK   PROC    NEAR
        XOR     AL,AL
        TEST    RMODS,01H       ;TEST RMOD FOR OPEN
        JNZ     RMDCK1          ;OPEN
        MOV     AH,LOCKC        ;ERROR COUNT
        CMP     AH,LOCK         ;MAXIMUM ERROR COUNT
        JB      RMDCK2          ;MAXIMUM ERROR COUNT NOT REACHED
RMDCK1: INC     AL
RMDCK2: MOV     BX,OFFSET CKPRS ;MONEY ORDER PRINTER - 0=ENABLE,1=DISABLE
        CALL    WEEPRM
        INC     BX              ;JOURNAL PRINTER     - 0=ENABLE,1=DISABLE
        CALL    WEEPRM
        INC     BX              ;KEYBOARD            - 0=ENABLE,1=LOCKED
        CALL    WEEPRM
        RET
RMDCK   ENDP
```

```
CODE    ENDS
        END
DATA    SEGMENT PUBLIC 'DATA'
        EXTRN   MOVP:BYTE,  TOTS:BYTE,  DSPR:BYTE,  SHFT:BYTE,  FEED:BYTE
        EXTRN   KEY :BYTE,  KEYP:BYTE,  KEYT:BYTE,  KEYD:BYTE
        EXTRN   KNDG:BYTE,  KCMD:BYTE,  KPCMD:BYTE
        EXTRN   KENTN:BYTE, KENTP:WORD
        EXTRN   KNBR:BYTE,  KFLD:BYTE,  KLCK:BYTE
        EXTRN   KDSP:BYTE,  KCNT:BYTE,  KTPE:BYTE
        EXTRN   KLLMT:DWORD, KULMT:DWORD
        EXTRN   KPTR:DWORD, KBIN:DWORD, KBPTR:DWORD

EXTRN   CHR:BYTE,   CMIN:BYTE,  CSEC:BYTE
        EXTRN   CSCRTY:WORD
        EXTRN   CSACC:DWORD, CSNBP:DWORD, CSCHK:BYTE
        EXTRN   CID:BYTE,   CIDL:BYTE
        EXTRN   CCNT:WORD,  CAMT:DWORD, CFEE:DWORD, CTOT:DWORD
        EXTRN   CFIDT:DWORD
        EXTRN   CMCNT:WORD, CMAMT:DWORD
        EXTRN   CVCNT:WORD, CVAMT:DWORD
        EXTRN   CFAMT:DWORD, CVOID:WORD
        EXTRN   CTCNT:WORD, CTAMT:DWORD
        EXTRN   KBFR:BYTE,  DBFR:BYTE,  SCRTCH:BYTE
DATA    ENDS

EPRM    SEGMENT PUBLIC 'EPRM'
        EXTRN   ECRTY:WORD
        EXTRN   STACC:WORD, STSTE:BYTE, STSUB:BYTE, STDL:WORD, STSTR:WORD
        EXTRN   MONTH:BYTE, DAY:BYTE,   YEAR:BYTE
        EXTRN   PHONE:BYTE
        EXTRN   USE:BYTE,   ID:BYTE
        EXTRN   FEELMT:DWORD, FEEAMT:DWORD
        EXTRN   MCNTC:WORD, MCNTM:WORD
        EXTRN   MAMTC:DWORD, MAMTM:DWORD
        EXTRN   VCNTC:WORD, VCNTM:WORD
        EXTRN   VAMTC:DWORD, VAMTM:DWORD
        EXTRN   BLANKS:BYTE, TRANS:BYTE, LCCY:BYTE
        EXTRN   BSACC1:WORD, BSNBP1:DWORD, BSCHK1:BYTE
        EXTRN   ESACC1:WORD, ESNBP1:DWORD, ESCHK1:BYTE
        EXTRN   BSACC2:WORD, BSNBP2:DWORD, BSCHK2:BYTE
        EXTRN   ESACC2:WORD, ESNBP2:DWORD, ESCHK2:BYTE
        EXTRN.  FMODS:BYTE, MODMS:BYTE, CYPPS:BYTE
        EXTRN   JPPRS:BYTE, KEYBS:BYTE, LOCYC:BYTE
EPRM    ENDS

CODE    SEGMENT PUBLIC 'CODE'
        EXTRN   PWRON:NEAR
        EXTRN   WEEPRM:NEAR
        EXTRN   TRNS:NEAR
        EXTRN   DISP:NEAR,  JPRT:NEAR,  CPRT:NEAR
        EXTRN   ASCBN:NEAR, BNASC:NEAR
        EXTRN   OPCMP:NEAR, OPADD:NEAR, OPSUB:NEAR, OPMUL:NEAR, OPDIV:NEAR
CODE    ENDS                ADPADD

CGROUP  GROUP   CODE, CONST, RESET
DGROUP  GROUP   INTV, STACK, DATA
        DB      KEY6
        DB      KEY3
        DB      KEYEN
```

CRO Assembler 03-06-84    PAGE    1-3

```
              DB      KEY8
              DB      KEY5
              DB      KEY2
              DB      KEY0
              DB      KEY7
              DB      KEY4
              DB      KEY1
              DB      KEYVD
KEYJT         DW      KENTR           ;KEYBOARD JUMP TABLE
              DW      KVOID
              DW      KSTRT
              DW      KNFEE
              DW      KID
              DW      KNO
              DW      KTRNS
              DW      KDEFN
              DW      KUP
              DW      KTOTL
              DW      KLOAD
              DW      KSHFT
              DW      KDISP
              DW      KPRNT
;DATA ENTRY AND DISPLAY TABLES
;   NUMBER OF DATA ITEMS TO BE ENTERED
;   16 CHARACTER DISPLAY
;   NUMBER OF POSSIBLE ENTRIES PER DATA ITEM
;   NUMBER OF FIELDS
;   NUMBER OF ERRONEOUS ENTRIES BEFORE SMOD LOCKS
;   DISPLAY START OF ENTRY - 0=NO DISPLAY
;   NUMBER OF CHARACTERS PER DISPLAY - 0=NONE ALLOWED
;   TYPE OF DATA - 1=BYTE, 2=WORD, 3=DWORD, 4=REAL, 5=ALPHA
;   LOWER LIMIT - 0=NO LIMIT CHECK, FFFFFFFF=CHECK AGAINST ARRAY IN UPPER LIMIT
;   UPPER LIMIT
;   DATA STORAGE POINTER
KSTRTN        EQU     2               ;START OF DAY KEYBOARD DATA
KSTRTD        DB      'ID              ',20,1,5

DB      14,3,1
              DD      0FFFFFFFFH,ID
              DD      CIDL
              DB      'YES #           ',1,3,0

DB      5,3,2
              DD      0FFFFFFFFH,BSACC1
              DD      CSACC
              DB      9,6,3
              DD      0FFFFFFFFH,BSNBR1
              DD      CSNBR
              DB      16,1,1
              DD      0FFFFFFFFH,BSCHK1
              DD      CSCHK
              DD      0FFFFFFFFH,SCRTY
              DD      CSCRTY
              DB      'DIAL TELEPHONE #',0,0,0

DB      0,0,0
              DD      0,0
```

```
        DD    TPNS
        DB    'DISCONNECT PMOD ',0,0,0

DB    0,0,0
        DD    0,0

DD    0
EFNN    EQU   19            ;DEFINE KEYBOARD DATA-ENTERED BY MANAGER
EFN9    DB    'SECURITY #    ',1,1,0

DB    0,5,2
        DD    0,0

DD    SCRTY
        DB    'ST            ',1,5,0

DB    7,7,2
        DD    0,0

DD    STACC
        DB    6,2,1
        DD    0,0

DD    STSTE
        DB    6,2,1
        DD    0,0

DD    STSUB
        DB    10,3,2
        DD    0,0

DD    STDIV
        DB    13,4,2
        DD    0,0

DD    STSTR
        DB    'DATE          ',1,3,0
        DD    MONTH
        DB    12,2,1
        DD    1,31
```

0 Assembler 03-06-84    PAGE   1-5

```
        DD    DAY
        DB    15,2,1
        DD    0,0

DD    YEAR
        DB    'TIME    :  : ',1,3,0

DB    9,2,1
        DD    0,24
```

```
DD    CHR
DB    12,2,1
DD    0.59

DD    CMIN
DB    15,2,1
DD    0.59

DD    CSEC
DB    'PHNE         ',1,1,0

DB    6,11,5
DD    0,0

DD    PHONE
DB    'ID USE       ',1,1,0

DB    16,1,1
DD    0.2

DD    USE
DB    'ID          ',20,1,0

DB    14,3,1
DD    0.255

DD    ID
DB    'FE          ',20,2,0

DB    2,3,4
DD    0.00000000

DD    FEELNT
DB    12,4,4
DB    'CST MO#      ',0,1,0
```

O Assembler 03-06-84    PAGE    1-6

```
DB    12,5,2
DD    0.0

DD    MCNTC
DB    'MCH MO#      ',0,1,0

DB    12,5,2
DD    0.0

DD    MCNTM
```

```
        DB      'CST NO$         ',0,1,0

DB      9.9,4
        DD      0,0

DD      MAMTC
        DB      'MCH NO$         ',0,1,0

DB      9.9,4
        DD      0,0

DD      MAMTM
        DB      'VND CK$         ',0,1,0

DB      12.5,2
        DD      0,0

DD      VCNTC
        DB      'MCH CK$         ',0,1,0

DB      12.5,2
        DD      0,0

DD      VCNTM
        DB      'VND CK$         ',0,1,0

DB      9.9,4
        DD      0,0

DD      MAMTC
        DB      'MCH CK$         ',0,1,0
        DD      0,0

DD      VAMTM
``` tO Assembler 03-06-84   PAGE   1-7

```
        DB      'WARN # BLANKS   ',0,1,0

DB      15.2,1
        DD      0,0

DD      BLANKS
        DB      'WARN # TRANS    ',0,1,0

DB      15.2,1
        DD      0,0
```

```
        DD      TRANS
        DB      'LOCK # ERRORS   ',0,1,0

DB      15,2,1
        DD      0,0

DD      LOCK
KLOADN  EQU     3
KLOADD  DB      'SECURITY # ',1,1,5

DB      0,5,2
        DD      0FFFFFFFFH,SCRTY
        DD      CSCRTY
        DB      'BEG#        ',1,3,0

DB      6,3,2
        DD      0FFFFFFFFH,STACC
        DD      BSACC2
        DB      9,6,3
        DD      0,0

DD      BSNBR2
        DB      16,1,1
        DD      0,0

DD      BSCHK2
        DB      'END#        ',1,3,0

DB      6,3,2
        DD      0FFFFFFFFH,STACC
        DD      ESACC2
        DB      9,6,3
;KEYBOARD MONITOR PROCEDURE
        PUBLIC  KEYB
KEYB    PROC    NEAR
        MOV     AL,KEYBS        ;### SECURITY CHECK ###
        XOR     AL,AL
        JNZ     KEYB0           ;### KEYBOARD LOCKED ###
        CALL    KEYSC           ;SCAN KEYBOARD FOR KEY DEPRESSED
        CMP     AL,KNKEY
        JL      KEYB1
KEYB0:  RET                     ;NO KEY OR NON-EXIST KEY
KEYB1:  XOR     CX,CX
        CMP     AL,10
        JL      KNMBR           ;NUMBER 0-9
        XCHG    KCMD,AL         ;ROTATE COMMANDS
        MOV     KPCMD,AL        ;SAVE PREVIOUS COMMAND
        SUB     AL,10
        MOV     CL,AL
        PUSH    CX              ;SAVE JUMP TABLE INDEX
        MOV     CL,KCNT         ;NUMBER OF DIGITS ALLOWED
        CMP     KNDG,0          ;NUMBER OF DIGITS ENTERED
        JZ      KEYB4           ;NO DATA ENTERED
        MOV     DI,KPTR         ;OFFSET OF DATA STORAGE IF ANY
        MOV     SI,OFFSET KBIN  ;TEMPORARY BINARY STORAGE
```

```
        MOV     BX,OFFSET SCRTCH
        MOV     AX,KBPTR        ;OFFSET OF DATA ENTERED
        CMP     KTPE,KALPHA     ;CHECK DATA TYPE
        JE      KEYB2           ;ALPHA
        PUSH    AX              ;SAVE KEYBOARD BUFFER ADDRESS
        PUSH    SI
        PUSH    BX
        PUSH    CX
        CALL    ASCBN           ;CONVERT TO BINARY
        PUSH    SI              ;POINTER TO CONVERTED BINARY NUMBER
        MOV     AX,OFFSET KLLMT
        PUSH    AX              ;LOWER LIMIT
        CALL    DPCMP           ;COMPARE
        SAL     AX,1
        JC      KEYB5           ;ERROR-NUMBER<LOWER LIMIT
        MOV     AX,OFFSET KULMT
        PUSH    AX              ;UPPER LIMIT
        PUSH    SI              ;CONVERTED BINARY NUMBER
        CALL    DPCMP           ;COMPARE
        SAL     AX,1
        JC      KEYB5           ;ERROR-UPPER LIMIT<NUMBER
        MOV     CL,KTPE
        CMP     CL,KDWRD
        JNE     KEYB2
        INC     SX              ;ADJUST CMPR COUNT
KEYB2:  MOV     AX,DS           ;TRANSFER DATA ENTERED
        CMP     KPTR+2,AX
        JE      KEYB3           ;DESTINATION=RAM ADDRESS
        MOV     BX,KPTR
KEYB2A: LODSB
        CALL    KEEPRM          ;DESTINATION=EE PROM
        INC     BX
        LOOP    KEYB2A
KEYB3:  OR      AX,AX
        JE      KEYB4           ;NO TRANSFER, LEAVE IN KBIN
        REP     MOVSB
```

0 Assembler 03-06-84     PAGE    1-10

KEYBOARD MONITOR PROCEDURE

```
KEYB4:  POP     BX              ;RETRIEVE JUMP TABLE INDEX
        SHL     BX,1            ;COMPUTE JUMP ENTRY
        JMP     KEYJT [BX]      ;PROCESS KEY
KEYB5:  POP     BX
        CALL    KERR
        RET
KNMBR:  ADD     AL,30H          ;CONVERT TO ASCII
        CLD
        MOV     SI,OFFSET KBFR+1
        MOV     DI,OFFSET KBFR
        MOV     CX,SKBFR-1
        REP     MOVSB           ;ROTATE KBFR TO LEFT
        STOSB                   ;ADD NEW CHARACTER TO RIGHT
        INC     KNDG            ;DIGIT COUNT
        CMP     KDSP,0          ;CHECK FOR DISPLAY
        JZ      KNMBR3          ;NO DISPLAY ALLOWED
        MOV     DI,OFFSET DBFR-1
        XOR     CH,CH
        MOV     CL,KDSP
        ADD     DI,CX
        MOV     SI,OFFSET KBFR + SKBFR
        MOV     CL,KCNT
```

```
            SUB     SI,CX
            MOV     KBPTR,SI        ;SAVE KBFR OFFSET
            PUSH    DI              ;SAVE START OF DISPLAY
            PUSH    CX              ;SAVE NUMBER OF CHARACTERS IN DISPLAY
            MOV     BL,KTPE         ;TYPE OF ENTRY BEING PROCESSED
            CMP     BL,KREAL
            JNE     KNMBR1
            POP     CX
            INC     CX              ;ADD DECIMAL POINT TO COUNT
            PUSH    CX
            SUB     CX,3            ;REAL ENTRY
KNMBR1:
    REP     MOVSB                   ;MOVE KBFR TO DBFR
            CMP     BL,KREAL        ;CHECK FOR REAL ENTRY
            JNE     KNMBR2
            MOV     AL,'.'          ;REAL ENTRY
            STOSB
            MOV     CL,2            ;MOVE FRACTION
    REP     MOVSB
KNMBR2:     MOV     AH,KDSP         ;START OF MESSAGE (1-16)
            MOV     AL,05H          ;CURSOR LINE, ON
            PUSH    AX
            CALL    DISP
KNMBR3:     RET
KENTR:      NOP                     ;ENTER KEY - *** C PROGRAM ***
KVOID:      MOV     AH,MOVP         ;VOID KEY
            MOV     AL,TOTS         ;TOTAL STATUS
            CMP     AH,1
            JE      KVOID1          ;MONEY ORDER VOID
            CMP     AH,2
            JE      KVOID2          ;VENDOR PAYMENT VOID
            CALL    KERR            ;ERROR-CLEAR ENTRY & BEEP
            RET
KVOID2:     MOV     SI,OFFSET CVCNT ;VENDOR PAYMENT VOID
            MOV     DI,OFFSET CVAMT
KVOID3:     XOR     BX,BX           ;CAMT,CFEE INDEX

RO Assembler 03-06-84    PAGE    1-11

KEYBOARD MONITOR PROCEDURE

MOV     CX,CCNT         ;# OF MO/VP ENTERED
            CMP     AL,0
            JNE     KVOID4          ;TOTAL KEY DEPRESSED, VOID ALL
            MOV     AL,4            ;VOID LAST ENTRY
            DEC     CL
            MUL     CL
            MOV     BX,AX
            MOV     CL,1
KVOID4:     PUSH    CX              ;# OF ENTRIES TO BE VOIDED
KVOID5:     DEC     CCNT            ;REDUCE COUNT
            DEC     CVCNT
            CMP     TOTS,1
            JNZ     KVOID6
            DEC     CTCNT           ;REDUCE TOTAL TRANSACTIONS
KVOID6:     LOOP    KVOID5
            POP     CX
            PUSH    CX
            PUSH    DI              ;SAVE CMAMT/CVAMT OFFSET
KVOID7:     MOV     SI,OFFSET CAMT
            ADD     SI,BX
            MOV     DI,OFFSET CTOT
            PUSH    SI
```

```
            PUSH    DI
            CALL    DPSUB           ;CTOT=CTOT-MO/VP
            CMP     MOVP,1
            JNE     KVOID9
            PUSH    SI              ;REDUCE FEES
            CMP     TOTS,0
            JE      KVOID8
            MOV     SI,OFFSET CFEE  ;SUBTRACT FEE FROM CTOT
            ADD     SI,CX
            PUSH    SI
            PUSH    DI
            CALL    DPSUB           ;CTOT=CTOT-CFEE
KVOID8:     XOR     AX,AX           ;ZERO FEE
            MOV     [SI],AX
            MOV     [SI+2],AX
            POP     SI
KVOID9:     POP     DI
            POP     SI
            PUSH    DI
            CALL    DPSUB           ;CMAMT/CVAMT=CMAMT/CVAMT-MO/VP
            PUSH    DI
            CMP     TOTS,1
            JNZ     KVOID10
            MOV     DI,OFFSET CTAMT ;REDUCE TOTAL AMOUNT
            PUSH    SI
            PUSH    DI
            CALL    DPSUB
KVOID10:    POP     DI
            XOR     AX,AX
            MOV     [SI],AX         ;ZERO CAMT
            MOV     [SI+2],AX
            INC     SI
            INC     SI
            JZ      KSTRT1          ;SECOND START KEY
            CALL    PWRON           ;POWER ON
            RET

80 Assembler 03-06-84    PAGE    1-12

KEYBOARD MONITOR PROCEDURE

KSTRT1: MOV     AL,KSTRTM       ;START DATA
        MOV     SI,OFFSET KSTRTD
        CALL    KINIT           ;INITIALIZE KEYBOARD & DISPLAY VARIABLES
        RET
KNFEE:  MOV     FEEC,1          ;NO FEE KEY - FEEC=1
        RET
KID:    MOV     SI,OFFSET KBIN  ;ID KEY
        LODSB
        MOV     CID,AL
        PUSH    ES              ;CHECK FOR VALID ID
        MOV     AX,EPRM
        MOV     ES,AX
        MOV     DI,OFFSET ID    ;EEPROM ADDRESS
        MOV     CX,NID          ;NUMBER OF IDS
        REPNE   SCASB
        POP     ES
        JB      KID1
        MOV     CID,0           ;ZERO CURRENT ID
        CALL    KERR            ;ERROR-WIPE OUT ENTRY AND BEEP
KID1:   RET                     ;MATCH FOUND
KMO:    MOV     SI,OFFSET KBIN  ;MONEY ORDER KEY
        MOV     DI,OFFSET CTOT
```

```
            PUSH    SI
            PUSH    DI
            CALL    DPADD           ;CTOT=CTOT+AMT ENTERED
            MOV     DI,OFFSET CMAMT
            PUSH    SI
            PUSH    DI
            CALL    DPADD           ;CMAMT=CMAMT+AMT ENTERED
            PUSH    ES
            MOV     AX,EPRM
            MOV     ES,AX
            MOV     DI,OFFSET MCNTC ;EEPROM ADDRESS
            MOV     AX,CCNT
            CMP     AX,NTR          ;CHECK NUMBERS
            JGE     KMOE            ;MONEY ORDERS EXCEEDED PER SYSTEM
            CMP     AX,ES:WORD PTR[DI]
            JGE     KMOE            ;MONEY ORDERS EXCEEDED PER CUSTOMER
            ADD     DI,2
            MOV     AX,CMCNT
            CMP     AX,ES:WORD PTR[DI]
            JGE     KMOE            ;MONEY ORDERS EXCEEDED PER MACHINE
            MOV     SI,OFFSET CTOT  ;CHECK AMOUNT PER CUSTOMER
            ADD     DI,2
            PUSH    SI
            PUSH    DI
            CALL    DPCMP           ;COMPARE TWO DOUBLE PRECISION NUMBERS
            CMP     AL,1
            JE      KM04            ;CTOT  MAX AMT PER CUSTOMER
            MOV     SI,OFFSET CMAMT ;CHECK AMOUNTS PER MACHINE
            ADD     DI,4
            PUSH    SI
            PUSH    DI
            CALL    DPCMP           ;COMPARE TWO DOUBLE PRECISION NUMBERS
            CMP     AL,1
KMOE:       POP     ES              ;KEYBOARD ERROR
            CALL    KERR            ;ERROR - CLEAR ENTRY & BEEP
            RET

RO Assembler 03-06-84   PAGE    1-13

KEYBOARD MONITOR PROCEDURE

KM00:       MOV     MOVP,1          ;MO/VP INDICATOR
            INC     CCNT
            INC     CMCNT
            MOV     AL,4
            MUL     BL
            MOV     BX,AX           ;CAMT & CFEE INDEX
            MOV     AX,KBIN         ;LOW BYTES OF MO
            MOV     CAMT[BX],AX
            MOV     AX,KBIN+2       ;HIGH BYTES OF MO
            MOV     CAMT[BX],AX
            MOV     AL,FEEC         ;CHECK IF FEE IS TO BE COMPUTED
            CMP     AL,0
            JE      KM03            ;NO FEE
            PUSH    ES
            MOV     AX,EPRM
            MOV     ES,AX
            MOV     SI,OFFSET KBIN  ;FIND FEE
            MOV     DI,OFFSET FEELMT-8
            MOV     CX,NFEE
KM01:       ADD     DI,8            ;*** ORDER CHANGED ***
            PUSH    SI
            PUSH    DI              ;*** WRONG ELEMENT ***
```

```
        CALL    DPCMP           ;COMPARE TWO DOUBLE PRECISION NUMBERS
        CMP     AX,1
        JNE     KM02            ;FEE FOUND-MONEY ORDER $ <= $ BREAKPOINT
        LOOP    KM01            ;NEXT FEE
KM02:   ADD     DI,4            ;FEE ADDRESS
        MOV     AX,ES:WORD PTR[DI]
        MOV     CFEE[BX],AX
        ADD     DI,2
        MOV     AX,ES:WORD PTR[DI]
        MOV     CFEE+2[BX],AX        CFEE + 2[BX], AX
        POP     ES
KM03:   RET
KM04:   POP     ES              ;AMOUNTS EXCEEDED-SUBTRACT LAST AMOUNTS
        MOV     SI,OFFSET KBIN
        MOV     DI,OFFSET CTOT
        PUSH    SI
        PUSH    DI
        PUSH    SI
        CALL    DPSUB           ;CTOT=CTOT-AMT ENTERED
        MOV     DI,OFFSET CMAMT
        PUSH    SI
        PUSH    DI
        PUSH    ES
        CALL    DPSUB           ;CMAMT=CMAMT-AMT ENTERED
        PUSH    ES
        JMP     KM0E            ;ERROR
KTRNS:  MOV     AL,KTRNSN       ;TRANSMIT KEY
        MOV     SI,OFFSET KTRNSD
        CALL    KINIT           ;INITIALIZE KEYBOARD & DISPLAY VARIABLES
        RET
KDEFN:  MOV     AL,KDEFNN       ;DEFINE KEY
        MOV     SI,OFFSET KDEFND
        CALL    KINIT           ;INITIALIZE KEYBOARD & DISPLAY VARIABLES
                KINIT
        MOV     DI,OFFSET CTOT  ;ZERO CURRENT TOTAL
        XOR     AX,AX
        STOSW
```

RO Assembler 03-06-84    PAGE    1-14

KEYBOARD MONITOR PROCEDURE

```
        STOSW
        MOV     AL,MOVP
        CMP     AL,0
        JE      KTOTL6          ;DISPLAY OR PRINT TOTALS
        CMP     AL,2
        JE      KTOTL3          ;VENDOR PAYMENT TOTAL
        CMP     AL,1
        JE      KTOTL1          ;MONEY ORDER TOTAL
        CALL    KERR
        RET
KTOTL1: MOV     CX,CCNT         ;MONEY ORDER TOTAL
        MOV     SI,OFFSET CFEE-4
        MOV     DI,OFFSET CTOT
KTOTL2: ADD     SI,4            ;FEE ADDRESS
        PUSH    SI
        PUSH    DI
        CALL    DPADD           ;ADD UP ALL FEES
        LOOP    KTOTL2
KTOTL3: MOV     CX,CCNT         ;SUM TOTAL TRANSACTIONS
        ADD     CTCNT,CX
        MOV     SI,OFFSET CAMT-4
```

```
            MOV     DI,OFFSET CTOT
YTOTL4:     ADD     SI,4
            PUSH    SI
            PUSH    DI
            CALL    DPADD
            LOOP    KTOTL4
            PUSH    DI
            MOV     SI,OFFSET CTAMT
            PUSH    SI
            CALL    DPADD           ;SUM MACHINE TOTAL
            MOV     SI,OFFSET MOTMSG ;MO TOT
            CMP     MOVP,1
            JE      KTOTL5
            MOV     SI,OFFSET VPTMSG ;VP TOT
KTOTL5:     MOV     DI,OFFSET DBFR
            PUSH    DI              ;DBFR ADDRESS FOR DISPLAY
            MOV     CX,7
            REP MOVS ES:BYTE PTR[DI],CS:[SI]
            MOV     SI,OFFSET CTOT  ;CONVERT TO ASCII & DISPLAY
            MOV     CX,OFFSET SCRTCH
            MOV     AH,9
            MOV     AL,KREAL
            PUSH    SI
            PUSH    DI
            PUSH    CX
            PUSH    AX
            CALL    BNASC           ;CONVERT TO ASCII
            MOV     AX,SDEFR
            PUSH    AX
            MOV     AX,120H         ;BLINKING DISPLAY, NO CURSOR
            PUSH    AX
            CALL    DISP            ;DISPLAY
KTOTLE:     RET
                                    ;TOTAL DISPLAY/BEFORE  NO PROGRAM
            RET
KSHFT:      MOV     SHFT,1          ;DAY/SHIFT KEY
            RET
```

RO Assembler 03-06-84    PAGE   1-15

KEYBOARD MONITOR PROCEDURE

```
KDISP:      MOV     DSPR,1          ;DISPLAY KEY - DSPR=1
            RET
KPRNT:      MOV     DSPR,2          ;PRINT KEY - DSPR=2
            MOV     AL,MOVP
            CMP     AL,0
            JNZ     KPRNT1          ;MO/VP PRINT
            RET
KPRNT1:     MOV     AL,CKPRS        ;*** SECURITY CHECK ***
            XOR     AL,AL
            JZ      KPRNT2          ;OK TO PRINT MONEY ORDERS/VENDOR PAYMENTS
            RET                     ;PRINTER DISABLED-IGNORE PRINT COMMAND
KPRNT2:     NOP                     ;PRINT CHECK - *** NO PROGRAM ***
KEYB        ENDP
            SUBTTL  KEYBOARD INITIALIZATION PROCEDURE
```

;    ****************************************************************
;    *   PRINTER DRIVER FOR RMOD. THIS PROGRAM ACCEPTS STRING    *
;    *   DATA AND TRANSFORMS IT INTO A LIST OF "CELL SPECS       *
;    *   WHICH ARE SORTED AND PROCESSED TO GENERATE A LINE AT A  *
;    *   TIME OF PIXEL DATA TO DRIVE THE FOUR PRINT SOLENOIDS    *
;    *   OF A _____ DOT MATRIX PRINTER                     *
;    *   THE ALGORITHM IS EXPLAINED IN A SEPARATE DOCUMENT       *

```
;     ***     TITLED "_____"                              ***
;     **********************************************************

STACK               SEGMENT     PARA    STACK   'STACK'
        STACK_BOTTOM        LABEL       WORD
                            ORG         OFFSET $+01FEH
        STACK_TOP           LABEL       WORD
        STACK               ENDS

DATA                SEGMENT     PARA    MEMORY  'DATA'

NEXT_CELL           LABEL       WORD
                            ORG         OFFSET $+2
        TOTAL_CELLS         LABEL       WORD
                            ORG         OFFSET $+2
        XCOORD              LABEL       WORD
                            ORG         OFFSET $+2
        YCOORD              LABEL       WORD
                            ORG         OFFSET $+2
        FONT                LABEL       BYTE
                            ORG         OFFSET $+1
        DIRECT              LABEL       BYTE
                            ORG         OFFSET $+1
        WDTH                LABEL       BYTE
                            ORG         OFFSET $+1
        HEIGHT              LABEL       BYTE
                            ORG         OFFSET $+1
        HSPACE              LABEL       BYTE
                            ORG         OFFSET $+1
        VSPACE              LABEL       BYTE
                            ORG         OFFSET $+1
        IPT_OFFS            LABEL       WORD
                            ORG         OFFSET $+2
        HORIZ               LABEL       WORD
                            ORG         OFFSET $+2
        VERT                LABEL       WORD
                            ORG         OFFSET $+2
        CSPECS_START        LABEL       WORD
                            ORG         OFFSET $+2
        ACTIVE_CELL_TABLE   LABEL       WORD
                            ORG         OFFSET $+(2*3*65)
        ACTIVE_LIST         LABEL       WORD
                            ORG         OFFSET $+2
        THIS_ENT            LABEL       WORD
                            ORG         OFFSET $+2
        NEXT_ENT            LABEL       WORD
                            ORG         OFFSET $+2
        FREE_LIST           LABEL       WORD
                            ORG         OFFSET $+2
        BACK                LABEL       WORD
                            ORG         OFFSET $+2
        FWD                 LABEL       WORD
                            ORG         OFFSET $+2
        NUMBER_ACTIVE       LABEL       BYTE
                            ORG         OFFSET $+1
        SWAPPED             LABEL       BYTE
                            ORG         OFFSET $+1

;       THIS IS THE OUTPUT LINE BUFFER FOR SOLENOID DATA

BUFF                LABEL       BYTE            ; ROOM FOR 16 BYTES
```

```
                    ORG         OFFSET $+16     ; LAST 2 FOR OVERFLOW

BIT                 LABEL       BYTE            ; HOLDS POSITION IN SCANLINE
                    ORG         OFFSET $+1
SCANLINE            LABEL       WORD            ; HOLDS CURRENT SCANLINE
                    ORG         OFFSET $+2
PR_SHADOW           LABEL       BYTE
                    ORG         OFFSET $+1
SOL                 LABEL       BYTE            ; HOLDS VAL OF CURRENT
                    ORG         OFFSET $+1      ; SOLENOID
INSERTED            LABEL       WORD            ; NUMBER OF CSPECS WHICH
                    ORG         OFFSET $+2      ; HAVE BEEN MADE ACTIVE
NXT2CHK             LABEL       WORD            ; OFFSET OF NXT CSPEC
                    ORG         OFFSET $+2      ; TO EXAMINE

;       FOR SIMULATION PURPOSES THIS VARIABLE WILL REPRESENT
;       THE IO PORT WHICH CONTROLS THE PRINTER THIS WILL HAVE
;       TO BE CHANGED TO AN I/O INSTRUCTION WHICH WRITES TO AN
;       IO SEGMENT ADDRESS

PRINT_PORT          LABEL       BYTE
                    ORG         OFFSET $+1

;       TEST DATA- TO BE REMOVED AFTER DEBUGGING IS DONE
;       THIS SPECIFIES 3 STRINGS TO BE PRINTED

STRING_LIST         DB          3                   ;3 STRING DESCRIPTORS
                    DW          OFFSET STRING1
                    DW          OFFSET STRING2
                    DW          OFFSET STRING3

STRING1             DW          0                   ;X COORDINATE
                    DW          0                   ;Y COORDINATE
                    DB          AFONT               ;STANDARD FONT
                    DB          DOWN                ;CHECK ORIENTATION
                    DB          3                   ;CHARACTER COUNT
                    DB          'ABC'               ;THE STRING

STRING2             DW          0                   ;X COORDINATE
                    DW          0                   ;Y COORDINATE
                    DB          AFONT               ;STANDARD FONT
                    DB          RIGHT               ;RECEIPT ORIENTATION
                    DB          4                   ;NUMBER OF CHARS
                    DB          'TX_J'              ;THE STRING

STRING3             DW          25                  ;XCOORDINATE
                    DW          10                  ;Y COORDINATE
                    DB          AFONT               ;STANDARD FONT
                    DB          LEFT                ;BACKWARDS DIRECTION
                    DB          2                   ;CHAR COUNT
                    DB          'HI'                ;THIRD STRING

FREE_SPACE          LABEL       WORD                ;SHOULD BE ENOUGH SPACE
                    ORG         $+(50*8)            ;FOR 50 CELL SPECS
END_DATA            LABEL       WORD
DATA                ENDS

;*********************************************************************
;EQUATES
;*********************************************************************
```

```
MAX_ACTIVE_CELLS        EQU     64
SIZE_OF_ACT             EQU     65
CSPEC_SIZE_IN_BYTES     EQU     8

RIGHT                   EQU     0
LEFT                    EQU     1
UP                      EQU     2
DOWN                    EQU     3

;OFFSETS WITHIN AN ACTIVE CELL TABLE ENTRY.

ACT_CSPEC_INDEX         EQU     0
ACT_BACK_PTR            EQU     2
ACT_FWD_PTR             EQU     4

;OFFSETS WITHIN A CELL SPEC

CSPEC_SCANLINE          EQU     0
CSPEC_FMEMOFFS          EQU     2
CSPEC_WIDTH             EQU     4
CSPEC_HEIGHT            EQU     5
CSPEC_XBYTEOFFS         EQU     6
CSPEC_XBITOFFS          EQU     7

;OFFSETS WITHIN A FONT DESCRIPTOR

FDESC_WIDTH             EQU     0
FDESC_HEIGHT            EQU     1
FDESC_HSPACE            EQU     2
FDESC_VSPACE            EQU     3
FDESC_IPTOFFS           EQU     4

;OFFSETS WITHIN A STRING DESCRIPTOR

STDESC_XCOORD           EQU     0
STDESC_YCOORD           EQU     2
STDESC_FONT             EQU     4
STDESC_DIRECT           EQU     5
STDESC_COUNT            EQU     6
STDESC_CHARS            EQU     7

MAX_SCANS               EQU     700     ;NUM SCANLINES PER MONEY ORDR
BITS_PER_SCAN           EQU     240     ;WIDTH OF ONE SCANLINE IN DOTS

;EQUATES USED WITH PRINT SHADOW REGISTER     PR_SHADOW

SOL1                    EQU     01H
SOL2                    EQU     02H
SOL3                    EQU     04H
SOL4                    EQU     08H
NOT_SOLENOIDS           EQU     0F0H
MTRDRV                  EQU     010H
NOT_MTRDRV              EQU     0EFH
MTRSTP                  EQU     020H
NOT_MTRSTP              EQU     0DFH
CLAMP_ON                EQU     080H
CLAMP_OFF               EQU     07FH

AFONT                   EQU     0
BFONT                   EQU     1

CODE                    SEGMENT     WORD    PUBLIC 'CODE'
```

```
                ASSUME          CS:CODE
                ASSUME          DS:DATA
                ASSUME          SS:STACK

;*******************************************************************************
; DRIVER ROUTINE :    THIS IS FOR DEBUGGING-SHOULD COME OUT LATER
;*******************************************************************************

TEST_STARTS:            MOV         AX,DATA
                        MOV         DS,AX

MOV         AX,STACK        ;SET UP STACK SEG
                        MOV         SS,AX
                        MOV         SP,OFFSET STACK_TOP ;SET UP STK PTR

MOV         DX,OFFSET FREE_SPACE
                        MOV         BX,OFFSET STRING_LIST
                        CALL        PRNTR
TEST_DONE:              JMP         TEST_DONE

;*******************************************************************************
;END OF DEBUGGING CODE
;*******************************************************************************

;*******************************************************************************
;
;   THIS IS THE MAIN ENTRY POINT FOR THE WHOLE PRINTER DRIVER
;   PRNTR EXPECTS TWO PARAMETERS:
;
;           1. THE OFFSET OF THE STRING LIST TABLE SHOULD BE IN BX reg
;
;           2. THE OFFSET OF UNRESTRICTED WORKSPACE ABOVE ALL STRINGS
;              AND OTHER DATA SHOULD BE IN DX reg
;
;*******************************************************************************

PRNTR:          ;       PUSHA   ***** 80186 INST. ;SAVE ALL REGISTERS
                                                  ; REPLACED BY THE FOLLOWING
                        PUSH        AX
                        PUSH        BX
                        PUSH        CX
                        PUSH        DX
                        PUSH        DS
                        PUSH        ES
                        PUSH        SS
                        PUSH        DI
                        PUSH        SI
                        PUSH        BP

MOV         AX,DATA         ;SET UP SEGMENT REGISTER
                        MOV         DS,AX

;   GET THE OFFSET OF UNRESTRICTED WORKSPACE IN WHICH WE MAY
;   BUILD THE TABLES. CALLER SHOULD SUPPLY THIS IN DX REGISTER

MOV         NEXT_CELL,DX    ;OFFSET OF FREE AREA IN DATA SEGMENT
                                                    ; FOR TABLES
                        MOV         TOTAL_CELLS,0   ;COUNTER FOR CELL SPECS
                        MOV         CSPECS_START,DX ;SAVE ORIGIN OF CELL SPEC TABLE.
```

```
                    SUB         CX,CX

;   BX HOLDS OFFSET IN DATA SEGMENT OF STRING LIST

MOV         CL,[BX]         ;GET NUMBER OF STRINGS TO PROCESS
                    INC         BX              ;BX HOLDS OFFSET OF WORD HOLDING
                                                ;OFFSET OF FIRST STRING IN LIST
;   CHECK FOR ZERO STRINGS
                    CMP         CL,0
                    JG          DO_A_STRING
                    JMP         LISTS_DONE
```

;*********************************************************************
; PROCESS EACH STRING IN THE STRING LIST. BX HOLDS THE OFFSET OF THE FIRST
; ENTRY IN THE STRING LIST TABLE. CL HOLDS THE NUMBER OF STRINGS TO PROCESS
; CSPECS_START HOLDS THE OFFSET OF THE AREA WHERE THE CELL SPECS WILL BE
; BUILT AND SORTED.
;*********************************************************************

```
DO_A_STRING:        MOV         DX,[BX]         ;DX HOLDS OFFSET OF NEXT STRING DESC
                    INC         BX              ;MAKE BX POINT TO WORD HOLDING
                    INC         BX              ;OFFSET OF NEXT STRING DESC AND
                    PUSH        BX              ;SAVE ON STACK FOR NEXT LOOP

;   NOW LOAD PARAMETERS FOR CURRENT STRING

MOV         BX,DX           ;OFFSET OF CURRENT STRING DESC
                    MOV         AX,[BX+STDESC_XCOORD]
                    MOV         XCOORD,AX

MOV         AX,[BX+STDESC_YCOORD]
                    MOV         YCOORD,AX

MOV         AL,[BX+STDESC_FONT]
                    MOV         FONT,AL

MOV         AL,[BX+STDESC_DIRECT]
                    MOV         DIRECT,AL

PUSH        BX              ;SAVE WHILE DOING NEXT

SUB         BX,BX           ;MULTIPLY FONT BY 6
                    MOV         BL,FONT         ;TO MAKE IT AN INDEX
                    SHL         BX,1            ;INTO THE FONT_SPEC_TABLE
                    MOV         DX,BX
                    SHL         BX,1
                    ADD         BX,DX

;NOW GET THE PARAMETERS FOR THE FONT REQUESTED

ADD         BX,OFFSET FONT_SPEC_TABLE

MOV         AL,CS:[BX+FDESC_WIDTH]
                    MOV         WDTH,AL   ; WIDTH IN BYTES

MOV         AL,CS:[BX+FDESC_HEIGHT]
                    MOV         HEIGHT,AL ; HEIGHT IN BITS

MOV         AL,CS:[BX+FDESC_HSPACE]
                    MOV         HSPACE,AL

MOV         AL,CS:[BX+FDESC_VSPACE]
```

```
                        MOV        VSPACE,AL

MOV        AX,CS:[BX+FDESC_IPTOFFS]
                        MOV        IPT_OFFS,AX
        ;NOW INITIALIZE CUMULATIVE POSITIONERS

MOV        HORIZ,0
                        MOV        VERT,0

POP        BX ; RESTORE OFFSET OF CURRENT STRING DESCRIPTOR
                        PUSH       CX ; SAVE STRING COUNTER

;SET UP REGISTERS TO LOOP THROUGH CHARACTERS OF CURRENT STRING

MOV        SI,NEXT_CELL
                        ADD        BX,STDESC_COUNT  ;BX IS OFFSET OF CHARACTER COUNT
                        SUB        CH,CH
                        MOV        CL,[BX]          ;LOOP COUNT = NUMBER OF CHARS

DO_A_CHAR:              INC        BX               ;POINT TO CURRENT CHAR
                        SUB        AX,AX
                        MOV        AL,[BX]          ;GET THE CHAR
                        PUSH       BX               ;SAVE PTR FOR NEXT LOOP
                        SHL        AX,1
                        ADD        AX,IPT_OFFS      ;POINT TO IPT ENTRY FOR CHAR
                        MOV        BX,AX
                        MOV        AX,CS:[BX]              ;GET FONT MEM OFFSET FOR CHAR

;NOW BUILD THE CELL SPEC POINTED TO BY SI REG

MOV        [SI+CSPEC_FMEMOFFS],AX   ;FMEM OFFSET

MOV        AX,YCOORD
                        ADD        AX,VERT
                        MOV        [SI+CSPEC_SCANLINE],AX   ;CHAR ORIGIN SCANLINE

MOV        AX,XCOORD
                        ADD        AX,HORIZ
                        MOV        DX,AX
                        AND        AX,0007H
                        MOV        [SI+CSPEC_XBITOFFS],AL   ;CHAR ORIGIN BIT REMAINDER

SHR        DX,1
                        SHR        DX,1
                        SHR        DX,1
                        MOV        [SI+CSPEC_XBYTEOFFS],DL  ;CHAR ORIGIN MOD BYTE

MOV        AL,WDTH
                        MOV        [SI+CSPEC_WIDTH],AL      ;CHAR WIDTH IN BYTES

MOV        AL,HEIGHT
                        MOV        [SI+CSPEC_HEIGHT],AL     ;CHAR HEIGHT IN BITS

;*****************************************************************
; NOW CHECK DIRECTION TO COMPUTE CUMULATIVE POSITIONERS FOR NEXT
; CHARACTER THE DRAWING SHOWS THE PRINT ORIENTATIONS
;*****************************************************************

;*****************************************************************
;
;       +-------------------------------------------------+
;       !                                                 !
```

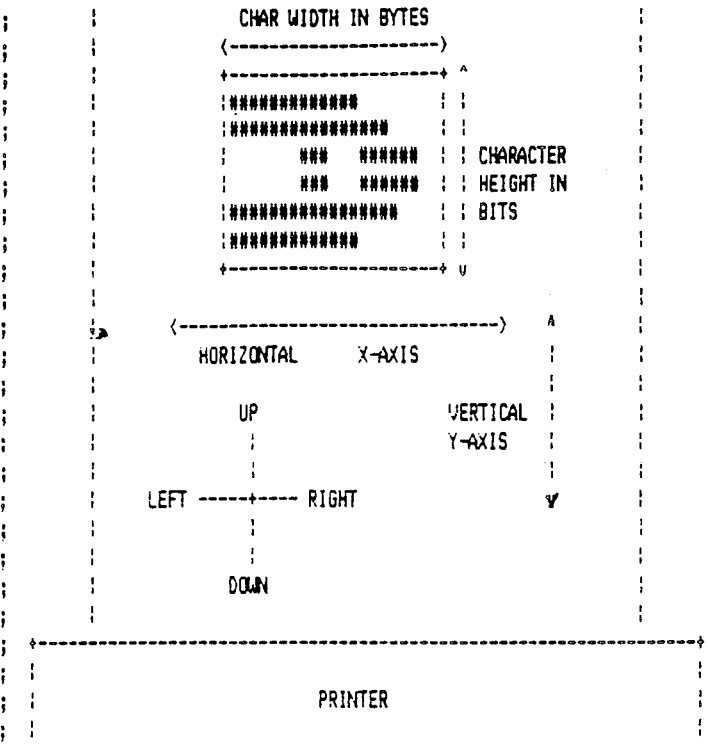

```
;                           CHAR WIDTH IN BYTES
;                        <--------------------->
;                        +---------------------+ ^
;                        :##############       : :
;                        :###############      : :
;                        :       ###    ###### : : CHARACTER
;                        :       ###    ###### : : HEIGHT IN
;                        :################     : : BITS
;                        :#############        : :
;                        +---------------------+ v
;
;                <----------------------------> ^
;                    HORIZONTAL    X-AXIS       :
;
;                           UP              VERTICAL  :
;                            :              Y-AXIS    :
;                            :                        :
;                  LEFT -----+----- RIGHT             :
;                            :                        v
;                            :
;                           DOWN
;
;           +-----------------------------------------------+
;           :                                               :
;           :                   PRINTER                     :
;           :                                               :
;           +-----------------------------------------------+
;
;
;     NORMAL ORIENTATION FOR CHECK PRINTING IS "DOWN"
;
;     NORMAL ORIENTATION FOR RECEIPTS WOULD BE "RIGHT"
;
;
;                       #####...   ^  ^
; FONT0:                ..#..#..   :  :
;                       ..#...#.   5  :
; Letter "A"            ..#..#..   :  7   CHAR WIDTH IN BYTES  = 1
;                       #####...   v  :   CHAR HEIGHT IN BITS  = 5
;                                     :   HORIZ SPACING IN BITS = 10
;                                     ^   VERT SPACING IN BITS  = 7
;                       <------>
;                        1 BYTE
;
;                       <-- 10 -->
;
;***************************************************************
TRY_RIGHT:      CMP     DIRECT, RIGHT   ;NORMAL, SO TRY THIS FIRST TO SAVE TIME
                JNE     TRY_UP          ;NOT RIGHT- GO ON
DO_RIGHT:       MOV     AL,HSPACE       ;NORMAL ORIENTATION ON A RECEIPT
                ADD     HORIZ,AX        ;NEXT CHAR IN THIS STRING WILL BE PLACED
                JMP     CSPEC_DONE      ;THIS CHARACTER'S HORIZONTAL SPACING
                                        ;TO THE RIGHT OF THIS CAHRACTER
TRY_UP:         CMP     DIRECT,UP
                JNE     TRY_LEFT
DO_UP:          MOV     AL,VSPACE       ;NEXT CHAR WILL BE PLACED THIS
                SUB     VERT,AX         ;CHARS VERTICAL SPACING ABOVE
                JMP     CSPEC_DONE      ;THIS CHARACTER TRY_LEFT:       CMP     DIRECT,LEFT     ;UPSIDE DOWN & BACKWARDS PRINTING
                JNE     DO_DOWN
DO_LEFT:        MOV     AL,HSPACE       ;NEXT CHAR WILL BE PLACED THIS
                SUB     HORIZ,AX        ;CHAR'S HORIXONTAL SPACING TO THE
```

```
                    JMP         CSPEC_DONE          ;LEFT OF THIS CHARACTER

DO_DOWN:            MOV         AL,VSPACE           ;NEXT CHAR WILL BE PLACED THIS
                    ADD         VERT,AX             ; CHAR'S VERTICAL SPACING BELOW
                                                    ;THIS CHARACTER. NORMAL
                                                    ; ORIENTATION FOR CHECK

CSPEC_DONE:         ADD         SI,CSPEC_SIZE_IN_BYTES
                    INC         TOTAL_CELLS
                    POP         BX                  ;RESTORE OFFSET OF
                    DEC         CX                  ;THIS CHAR IN
                    JZ          STRING_DONE         ;STRING DESCRIPTOR
                    JMP         DO_A_CHAR

STRING_DONE:        POP         CX                  ;RESTORE STRING LOOP CTR
                    POP         BX                  ;RESTORE OFFSET OF
                    MOV         NEXT_CELL,SI        ;SAVE THE OFFSET
                    DEC         CX                  ;NEXT SLOT IN STRING
                    JZ          SORT_CSPECS         ;TABLE
                    JMP         DO_A_STRING

;****************************************************************
; IN-PLACE BUBBLE SORT OF CSPEC LIST INTO ASCENDING ORDER BASED ON
; CONTENTS OF 1ST WORD IN EACH CELL SPEC
;****************************************************************

SORT_CSPECS:        MOV         CX,TOTAL_CELLS
                    DEC         CX                  ;OUTER LOOP IS DONE n - 1 TIMES
I_LOOP:             PUSH        CX                  ;SAVE OUTER LOOP COUNTER

MOV         BX,CSPECS_START     ;BEGINNING OF TABLE TO SORT
                    MOV         SWAPPED,0           ;SET FLAG CLEAR FOR NEXT INNER LOOP
                    MOV         CX,TOTAL_CELLS      ;INNER LOOP IS DONE n - 2
                    SUB         CX,2                ;TIMES
J_LOOP:             PUSH        CX                  ;SAVE INNER LOOP COUNTER
                    MOV         AX,[BX]             ;COMPARE ACT_CSPEC_INDICES FOR
                    CMP         AX,[BX+8]           ;TWO ADJACENT CELLS. IF OUT OF
                    JNG         NO_SWAP             ;ORDER, THEN SWAP THEIR CONTENTS
SWAP:               PUSH        CX                  ;SAVE INNER LOOP COUNTER
                    MOV         CX,CSPEC_SIZE_IN_BYTES/2 ;LOOP HERE ONCE FOR EACH
                                                    ;WORD IN A CELL SPEC
SWAP_LOOP:          MOV         AX,[BX]             ;GET THE WORDS TO SWAP
                    MOV         DX,[BX+8]
                    MOV         [BX],DX             ;PUT THEM BACK IN SWAPPED
                    MOV         [BX+8],AX           ;POSITIONS
                    ADD         BX,2
                    LOOP        SWAP_LOOP

POP         CX

MOV         SWAPPED,1           ;SET FLAG SAYING AT LEAST ONE SWAP
                                                    ;IN THRU INNER LOOP
                    JMP         NEXT_J

NO_SWAP:            ADD         BX,8                ;ADJUST POINTER UP ONE CELLSPEC

NEXT_J:             POP         CX                  ;RESTORE INNER LOOP COUNTER

LOOP        J_LOOP

CMP         SWAPPED,0           ;IF FLAG WAS SET, SWAPS WERE MADE
```

```
                        JNE         NOT_DONE        ;AND WE ARE NOT DONE
                        POP         CX              ;BUT IF FLAG WAS NOT SET,
                                                    ;RESTORE STACK
                        JMP         LISTS_DONE      ;AND GET OUT OF SORT ROUTINE

NOT_DONE:               POP         CX              ;RESTORE OUTER LOOP COUNTER
                        LOOP        I_LOOP
```

;****************************************************************
; CELL SPEC LIST IS SORTED AND READY TO PROCESS SEQUENTIALLY
; NOW FIRE UP THE PRINTER, BUILD SCANLINES, AND PRINT IT ALL
;****************************************************************

```
LISTS_DONE:             CALL        REL_CLAMP       ; RELEASE PAPER CLAMP
                        CALL        ACT_INIT        ; INITIALIZE ACTIVE LIST
                        MOV         SCANLINE,0
                        MOV         SOL, 01H        ; READY FIRST SOLENOID
                        MOV         INSERTED, 0
                        MOV         AX, CSPECS_START
                        MOV         NXT2CHK,AX
                        CALL        SOLENOIDS_OFF   ; RELEASE ANY SOLENOIDS THAT
                                                    ; MIGHT INADVERTENTLY BE ON
                        CALL        MOTOR_ON        ; START MOVING PAPER
```

;****************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND DUMP IT EVERY TIME THEREAFTER THAT A PRINT CLOCK SIGNAL IS
; DETECTED.
;****************************************************************

```
WAIT4RST:               CALL        PRTST
                        AND         AL,AL
                        JZ          WAIT4RST
```

;****************************************************************
; CHECK NOW TO DETERMINE WHETHER ALL SCANLINES HAVE BEEN MADE
; AND, IF SO, QUIT AND TURN OFF THE MOTOR BEFORE RETURNING
;****************************************************************

```
WEHAVERST:              CMP         SCANLINE, MAX_SCANS
                        JE          CHECK_PRINTED

CALL        BUILD_NXT_SCAN
                        MOV         BIT,0;
```

;****************************************************************
; WAIT TILL PRINT CLOCK HAS BEEN ASSERTED
;****************************************************************

```
WAIT4CLK:               CALL        PRTST
                        AND         AH,AH
                        JZ          WAIT4CLK
```

;       CHECK WHETHER ALL BITS IN THE SCANLINE HAVE BEEN ACCOUNTED FOR

```
WEHAVECLK:              CMP         BIT,BITS_PER_SCAN
                        JNE         DO_DE_BIT
                        INC         SCANLINE
                        JMP         WAIT4RST
```

; TURN OFF THE LAST SOLENOID BY TURNING OFF ALL OF THEM
; THEN FIND THE STATE OF THE CURRENT BIT AND, IF TRUE,
; FIRE PROPER SOLENOID

```
DO_DE_BIT:          AND         PR_SHADOW, 0F0H ; OFF ALL SOLENOIDS

CALL        ISOLATE_BIT     ; TEST BIT "BIT"
                    AND         AL,AL           ; TEST VALUE PUT HERE
                                                ; BY ISOLATE_BIT
                    JZ          DONT_FIRE

; WE WILL FIRE THE NEXT SOLENOID THIS TIME

FIRE_ONE:           MOV         DL,SOL
                    OR          PR_SHADOW,DL

;       WE MAY OR MAY NOT HAVE ORED A SOLENOID BIT INTO THE SHADOW AT THIS POINT

DONT_FIRE:          INC         BIT             ; POINT TO NEXT BIT
                    CMP         SOL,SOL4        ; IF TRUE RESET TO SOL1
                    JE          SOL_IS_8
SOL_NOT_8:          SHL         SOL,1           ; OTHERWISE SET NXT SOL
                    JMP         WRITE_SHADOW
SOL_IS_8:           MOV         SOL,SOL1        ; RESETS SOL TO SOL1
        ; WRITE THE VALUE IN THE SHADOW REGISTER TO THE OUTPUT PORT

WRITE_SHADOW:       MOV         AL, PR_SHADOW
                    MOV         PRINT_PORT,AL

; NOW WAIT FOR THE NEXT PRINT CLOCK

JMP         WAIT4CLK

; THE LAST SCANLINE SHOULD HAVE BEEN PRINTED.
        ; NOW TURN OFF THE MOTOR AND ALL SOLENOIDS AND RETURN

CHECK_PRINTED:      CALL        MOTOR_OFF;
                    CALL        SOLENOIDS_OFF

; NOW ALL DONE PRINTING, RETURN TO THE ROUTINE THAT CALLED PRNTR

;       POPA    **** 80186 INST.    ; RESTORE ALL REGISTERS REPLACED BY
                                    ; THE FOLLOWING

POP         BP
                    POP         SI
                    POP         DI
                    POP         SS
                    POP         ES
                    POP         DS
                    POP         DX
                    POP         CX
                    POP         BX
                    POP         AX

RET

;ROUTINES FOR MANAGING THE ACTIVE CELL LIST
```

;INITIALIZING THE ACTIVE CELL LIST

```
ACT_INIT:           MOV         BX,OFFSET ACTIVE_CELL_TABLE
                    MOV         CX,SIZE_OF_ACT
                    MOV         AX,01H
INIT_ACT:           MOV         [BX+ACT_FWD_PTR],AX  ;LINK EACH ENTRY BY
                    INC         AX                   ;MAKING EACH FORWARD
                    ADD         BX,6                 ;POINTER POINT TO THE
                    LOOP        INIT_ACT             ;NEXT ENTRY IN THE LIST

MOV         FREE_LIST,0          ;FREE LIST STARTS WITH 0th ENTRY
                    MOV         NUMBER_ACTIVE,0      ;ACTIVE LIST IS NULL
                    MOV         ACTIVE_LIST,0FFFFH
                    RET                              ;ALL DONE
```

;INSERTING A CELL SPEC INTO THE ACTIVE CELL LIST
;AX HOLDS INDEX INTO SORTED LIST OF CELL SPECS
;ALGORITHM IS:
;       OLD_ACTIVE = ACTIVE_LIST
;       ACTIVE_LIST = FREE_LIST
;       FREE_LIST = FREE_LIST(4)
;
;       ACTIVE_ENTRY(CSPINDX) = CELL SPEC INDEX
;       ACTIVE_ENTRY(BKPTR) = NULL   (THIS IS BACK PTR OF 1ST IN NEW ACT LIST)
;       ACTIVE_ENTRY(FWDPTR) = OLD_ACTIVE
;       IF OLD_ACTIVE NOT NULL THEN
;               OLD_ACTIVE ENTRY(BKPTR) = ACTIVE_LIST

```
INSERT_INTO_ACT:
                    CMP         NUMBER_ACTIVE,MAX_ACTIVE_CELLS
                    JAE         TOO_MANY_INSERTS
;       MAKE OLD_ACT = ACTIVE_LIST CX USED TO HOLD OLD_ACTIVE
                    MOV         DX,ACTIVE_LIST
                    MOV         CX, DX

;       ACTIVE_LIST = FREE_LIST
                    MOV         SI, FREE_LIST
                    MOV         ACTIVE_LIST,SI

;       FREE_LIST = FORMER 2ND ENTRY IN FREE LIST. MULTIPLY INDEX BY 6
                    SHL         SI,1
                    MOV         DI,SI
                    SHL         SI,1
                    ADD         SI,DI
                    MOV         BX, OFFSET ACTIVE_CELL_TABLE
                    MOV         DI, [BX+SI+ACT_FWD_PTR]
                    MOV         FREE_LIST, DI

;       SI STILL POINTS TO OFFSET OF NEW ACTIVE ENTRY
;       FIX UP THREE ENTRIES IN NEWLY ACTIVE CELL
                    MOV         [BX+SI+ACT_CSPEC_INDEX], AX  ; INDEX OF CSPEC BEING ADDED
                    MOV         WORD PTR [BX+SI+ACT_BACK_PTR],0FFFFH
                    MOV         AX, CX
                    MOV         [BX+SI+ACT_FWD_PTR],AX
                    CMP         AX,0FFFFH
                    JE          BUMP_ACTIVES

;       OLD_ACTIVE WAS NOT NULL, SO LINK ITS BACK PTR TO THE NEW HEAD OF ACTIVES
;       AX HOLDS OLD_ACTIVE. MULTIPLY IT BY 6
                    SHL         AX,1
                    MOV         SI,AX
                    SHL         SI,1
                    ADD         SI,AX
```

```
                        MOV     AX,ACTIVE_LIST
                        MOV     [BX+SI+ACT_BACK_PTR],AX
BUMP_ACTIVES:           INC     NUMBER_ACTIVE
TOO_MANY_INSERTS:       RET

;ROUTINE TO REMOVE EXHAUSTED CELL SPEC FROM ACTIVE LIST
;AND RETURN ITS SLOT TO FREE LIST. AX HOLDS INDEX INTO ACTIVE CELL TABLE OF;
;ENTRY TO BE REMOVED

REMOVE_FROM_ACT:
                        CMP     NUMBER_ACTIVE,0             ;IF NONE,WE HAVE
                                                            ;A PROBLEM
                        JG      OK_TO_REMOVE
                        JMP     TOO_MANY_REMOVALS
OK_TO_REMOVE:           MOV     BX,OFFSET ACTIVE_CELL_TABLE  ;HEAD OF TABLE
                        MOV     SI,AX               ;MULTIPLY INDEX BY 6
                        SHL     SI,1                ;TO MAKE IT A BYTE
                        MOV     CX,SI               ;INDEX INTO THE ACT
                        SHL     SI,1
                        ADD     SI,CX
                        MOV     DX,[BX+SI+ACT_BACK_PTR] ;SAVE THIS
                        MOV     BACK,DX

MOV     DX,[BX+SI+ACT_FWD_PTR]          ;AND THIS
                        MOV     FWD,DX

MOV     DX,FREE_LIST        ;LINK THIS ENTRY INTO
                        MOV     [BX+SI+ACT_FWD_PTR],DX

MOV     FREE_LIST,AX        ;FREE LIST AHEAD OF ALL OTHERS
                        CMP     BACK,0FFFFH         ;WAS HEAD OF ACT HOLDING
                        JNE     NOT_FIRST           ;THE FIRST ENTRY IN FREE LIST
FIRST:                  MOV     AX,FWD              ;YES, IT WAS
                        MOV     ACTIVE_LIST,AX      ;ACTIVE NOW POINTS TO WHAT
                                                    ;THIS ENTRY USED TO POINT TO
                        MOV     SI,AX               ;MAKE THIS INTO BYTE INDEX
                        SHL     SI,1
                        MOV     CX,SI
                        SHL     SI,1
                        ADD     SI,CX
                        MOV     WORD PTR [BX+SI+ACT_BACK_PTR],0FFFFH
                                                    ;MAKE SUCESSOR'S
                                                    ;BACK PTR NULL
                                                    ;BECAUSE IT IS NEW HEAD
                                                    ;OF ACTIVE LIST
                        DEC     NUMBER_ACTIVE       ;ALL DONE
                        RET

NOT_FIRST:              CMP     FWD,0FFFFH          ;IS ENTRY TO BE REMOVED IN MIDDLE
                        JNE     MIDDLE
LAST:                   MOV     SI,BACK             ;NO, IT IS LAST IN LIST
                        SHL     SI,1
                        MOV     CX,SI               ;MAKE THE PREDECESSOR'S
                        SHL     SI,1                ;FORWARD
                        ADD     SI,CX               ;POINTER
                        MOV     WORD PTR [BX+SI+ACT_FWD_PTR],0FFFFH
                                                    ;NULL FWD PTR BECAUSE LAST
                        DEC     NUMBER_ACTIVE
                        RET                         ;ALL DONE
MIDDLE:                 MOV     SI,FWD              ;CELL TO BE REMOVED IS
                        SHL     SI,1                ;SOMEWHERE IN THE MIDDLE
```

```
                    MOV         CX,SI
                    SHL         SI,1            ;MAKE PREDECESSOR'S
                    ADD         SI,CX           ;FWD POINTER
                    MOV         AX,BACK         ;POINT TO SUCESSOR
                    MOV         [BX+SI+ACT_BACK_PTR],AX
                    MOV         SI,AX           ;AND MAKE
                    SHL         SI,1            ;SUCESSOR'S
                    MOV         CX,SI           ;BACK PTR
                    SHL         SI,1            ;POINT TO
                    ADD         SI,CX           ;PREDECESSOR
                    MOV         AX,FWD
                    MOV         [BX+SI+ACT_FWD_PTR],AX
                    DEC         NUMBER_ACTIVE
TOO_MANY_REMOVALS:  RET                         ;ALL DONE

;
; ROUTINE TO DETERMINE THE STATE OF A BIT IN THE SCANLINE BUFFER

ISOLATE_BIT:        SUB         BX,BX           ; CLEAR THIS REGISTER
                    MOV         BL,BIT          ; GET INDEX OF BIT IN
                                                ;   SCANLINE BUFFER
                    MOV         DL,BL           ; SAVE IT TEMPORARILY
                    MOV         CX,3            ; FOR DIVIDE BY 8 TO GET
                    SHR         BX,CL           ;   BYTE INDEX OF BUFF
                    AND         DL,7            ; FIND BIT REMAINDER
                    INC         DL              ; FOR BITS TO SHIFT OUT
                    ADD         BX,OFFSET BUFF  ; POINT TO BYTE IN MEM
                    MOV         AL,[BX]         ; READ BYTE OF BUFF
                    MOV         CL,DL           ; SHIFT COUNT
                    SHL         AL,CL           ; SHIFT DESIRED BIT OUT
                                                ; TO CARRY FLAG
                    JC          SET_BIT         ; IF CARRY THEN BIT = T
                    SUB         AX,AX           ; CLR AX IF BIT FALSE
                    RET
SET_BIT:            MOV         AX,1            ; SET AX IF BIT TRUE
                    RET

; ROUTINE TO TURN OFF ALL FOUR SOLENOIDS

SOLENOIDS_OFF:      AND         PR_SHADOW, NOT_SOLENOIDS
                    MOV         AL, PR_SHADOW
                    MOV         PRINT_PORT, AL
                    RET
; ROUTINE TO TURN MOTOR ON

MOTOR_ON:           OR          PR_SHADOW, MTRDRV
                    AND         PR_SHADOW, NOT_MTRSTP
                    MOV         AL, PR_SHADOW
                    MOV         PRINT_PORT,AL
                    RET

; ROUTINE TO TURN MOTOR OFF

MOTOR_OFF:          OR          PR_SHADOW, MTRSTP
                    AND         PR_SHADOW, NOT_MTRDRV
                    MOV         AL, PR_SHADOW
                    MOV         PRINT_PORT, AL
                    RET
```

; ROUTINE TO REMOVE ALL POWER FROM MOTOR

```
MTR_PWR_OFF:        AND         PR_SHADOW, NOT_MTRSTP
                    AND         PR_SHADOW, NOT_MTRDRV
                    MOV         AL, PR_SHADOW
                    MOV         PRINT_PORT, AL
                    RET
```

; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

```
FIRE_SOLENOID:      AND         PR_SHADOW, NOT_SOLENOIDS
                    MOV         AL, SOL
                    OR          PR_SHADOW, AL
                    MOV         PRINT_PORT, AL
                    RET
```

; ROUTINE TO SET THE STATE OF THE PAPER CLAMP TRUE, TO HOLD THE PAPER

```
SET_CLAMP:          OR          PR_SHADOW, CLAMP_ON
                    MOV         AL, PR_SHADOW
                    MOV         PRINT_PORT, AL
                    RET
```

; ROUTINE TO RELEASE THE PAPER CLAMP

```
REL_CLAMP:          AND         PR_SHADOW, CLAMP_OFF
                    MOV         AL, PR_SHADOW
                    MOV         PRINT_PORT, AL
                    RET
```
;*********************************************************************
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;*********************************************************************

;       FIRST, CLEAR OUT THE OLD BUFFER SO ALL NEW DATA MAY BE ORED IN

```
BUILD_NXT_SCAN:
                    MOV         CX,08H      ; NUMBER OF WORDS TO CLEAR
                    SUB         AX,AX       ; CLEAR THIS TO ZERO
                    MOV         BX, OFFSET BUFF
CLR_BUFF:           MOV         [BX], AX;
                    INC         BX
                    INC         BX
                    LOOP        CLR_BUFF
```

;       NEXT FIND ANY NEW ACTIVE CELL SPECS TO INSERT INTO THE ACTIVE LIST
;       CHECK WHETHER ALL CSPECS HAVE BEEN MADE ACTIVE BY THIS TIME

```
CHECK4INSRT:        MOV         DX, INSERTED
                    CMP         DX, TOTAL_CELLS
                    JE          PROCESS_ACT
```

;       IF THEY HAVE NOT ALL BEEN PLACED INTO ACT THEN CHECK TO SEE IF ANY
;       WILL GO INTO ACT FOR THIS SCANLINE

```
                MOV         BX, NXT2CHK         ; OFFS OF NXT CSPEC TO CHECK
                MOV         AX,[BX]             ; AX NOW HAS SCANLINE
                CMP         AX,SCANLINE         ; IS IT = CURRENT SCANLINE?
                JNE         PROCESS_ACT         ; IF NOT, NO INSERTS

;       NOW INSERT CELLS INTO ACT WHILE THEIR SCANLINES ARE
;       EQUAL TO CURRENT SCANLINE

INSERT_CELL:    MOV         AX,BX               ; OFFS OF CSPEC TO INSERT
                INC         INSERTED            ; INDEX OF CSPEC TO GO IN
                CALL        INSERT_INTO_ACT
                ADD         NXT2CHK, CSPEC_SIZE_IN_BYTES
                JMP         CHECK4INSRT

;       NOW PROCESS ALL ACTIVE CELLS FIRST CECK WHETHER ANY ARE ACTIVE

PROCESS_ACT:    CMP         NUMBER_ACTIVE,0
                JG          SOME_R_ACTV
                RET                             ; BECAUSE NONE R ACTIVE

SOME_R_ACTV:    MOV         SI,ACTIVE_LIST      ; INDX OF ACT OF 1ST ENT
                MOV         NEXT_ENT,SI         ; IS NEXT TO LOOK AT
NEXT_CSPEC:     MOV         SI,NEXT_ENT         ; NEXT IS CURRENT
                MOV         THIS_ENT,SI         ;   ONE TO LOOK AT
                SHL         SI,1                ; MAKE THIS_ENT AN INDX
                MOV         DI,SI
                SHL         SI,1
                ADD         SI,DI
;       SAVE INDEX IN ACT OF NEXT ENTRY TO CHECK, MAY BE FFFF IF NO MORE

MOV         BX,OFFSET ACTIVE_CELL_TABLE
                MOV         DX,[BX+SI+ACT_FWD_PTR] ; LINK TO NXT ACTIVE CELL
                MOV         NEXT_ENT,DX

;       NOW GET OFFSET OF CSPEC TO EXAMINE FIRST; BX STILL HAS OFFSET OF ACT

MOV         BX,[BX+SI]          ; CSPEC OFFSET IN SORTED TABLE

;       PROCESS ONE CELL SPEC

MOV         DI,[BX+CSPEC_XBYTEOFFS]
                AND         DI, 00FFH           ; WE ONLY WANT BYTE IN LOW
                                                ; HALF OF DI REG
                MOV         SI,[BX+CSPEC_FMEMOFFS]
                SUB         CX,CX
                MOV         CL,[BX+CSPEC_WIDTH]
                SUB         DX,DX               ; CLEAR SAVE REGISTER
ONE_CELL:       SUB         AX,AX               ; CLEAR WORK REGISTER
                MOV         AH, CS:[SI]         ; READ A BYTE OF FONT MEM
                                                ; FROM CODE SEGMENT
                PUSH        CX
                MOV         CL,[BX+CSPEC_XBITOFFS]
                SHR         AX,CL               ; ALIGN WITH SCANLINE
                                                ; BIT OFFSET
                POP         CX                  ; RESTORE WIDTH LOOP CTR
                OR          AH,DH               ; OR IN SAVED BITS FROM
                                                ; PREVIOUS BYTE
                MOV         BP, OFFSET BUFF
                OR          DS:[BP+DI],AH       ; OR DATA INTO SCANLINE
                MOV         DH,AL               ; SAVE BITS SHIFTED OUT
                INC         DI                  ; INC SCANLINE BYTE INDEX
                INC         SI                  ; INC FONT MEM INDEX
```

```
                    LOOP        ONE_CELL
;   NOW IF DH NOT ZERO THEN THERE WAS DATA SHIFTED OUT OF AX WHICH MUST
;   ALSO BE ORED INTO THE SCANLINE. THE BYTE OFFSET IN DI HAS BEEN INCREMENTED
;   SO JUST OR IN DH RATHER THAN AH

OR          DS:[BP+DI],DH

MOV         [BX+CSPEC_FMEMOFFS],SI
                                            ; UPDATE FONT MEM OFFSET
                    DEC         BYTE PTR [BX+CSPEC_HEIGHT]
                    JNZ         GETNXTCSPC
                    MOV         AX,THIS_ENT
                    CALL        REMOVE_FROM_ACT
GETNXTCSPC:         CMP         NEXT_ENT, 0FFFFH
                    JNE         NEXT_CSPEC

NO_MORE_ACTV:       RET         ; ALL ACTIVE CELLS PROCESSED
```

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. A money order dispenser, comprising:
  a plurality of money order forms each having preprinted indicia and a first code mark printed thereon;
  printing means for printing a second code mark and variable indicia on each of said money order forms;
  indicia reading means for determining whether said second code mark has been printed on each of said money order forms prior to printing said variable indicia; and
  control means responsive to said indicia reading means for disabling operation of the printing means if said second code mark has not been printed.

2. The money order dispenser of claim 1 wherein said indicia reading means includes a photocell for reading said first code mark and generating a first signal in response thereto, said first signal representing proper alignment of a money order form in said printing means.

3. The money order dispenser of claim 1 wherein said photocell reads said second code mark and generates a second signal in response thereto, said second signal representing proper placement of a printing ribbon in the printing means, and a completely operational printing means.

4. The money order dispenser of claim 1 further including a normally sealed compartment for containing the money order forms.

5. The money order dispenser as described in claim 4 wherein said control means is responsive to unauthorized opening of the normally sealed compartment for disabling operation of the printing means.

* * * * *